(12) United States Patent
Malladi et al.

(10) Patent No.: US 11,782,707 B2
(45) Date of Patent: *Oct. 10, 2023

(54) SYSTEMS AND METHODS FOR DATA PLACEMENT FOR IN-MEMORY-COMPUTE

(71) Applicant: Samsung Electronics Co., Ltd., Suwon-si (KR)

(72) Inventors: Krishna T. Malladi, San Jose, CA (US); Wenqin Huangfu, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,220

(22) Filed: Dec. 10, 2021

(65) Prior Publication Data
US 2022/0171620 A1 Jun. 2, 2022

Related U.S. Application Data

(63) Continuation of application No. 16/859,829, filed on Apr. 27, 2020, now Pat. No. 11,226,816.
(Continued)

(51) Int. Cl.
G06F 9/30 (2018.01)
G06F 7/57 (2006.01)
G06F 7/53 (2006.01)

(52) U.S. Cl.
CPC .......... *G06F 9/3001* (2013.01); *G06F 7/5318* (2013.01); *G06F 7/57* (2013.01);
(Continued)

(58) Field of Classification Search
CPC ........ G06F 9/3001; G06F 7/5318; G06F 7/57; G06F 9/30036; G06F 9/30098; G06F 9/3016; G06F 7/5443; G06F 9/3004; G06F 15/7821; G06F 12/0246; G06F 12/0811; G06F 13/1668; G06F 3/0631;
(Continued)

(56) References Cited

U.S. PATENT DOCUMENTS 5,953,738 A * 9/1999 Rao ...................... G11C 7/1006
711/E12.041
6,295,586 B1 9/2001 Novak et al.
(Continued)

*Primary Examiner* — Farley Abad
(74) *Attorney, Agent, or Firm* — Lewis Roca Rothgerber Christie LLP

(57) ABSTRACT

According to one embodiment, a memory module includes: a memory die including a dynamic random access memory (DRAM) banks, each including: an array of DRAM cells arranged in pages; a row buffer to store values of one of the pages; an input/output (IO) module; and an in-memory compute (IMC) module including: an arithmetic logic unit (ALU) to receive operands from the row buffer or the IO module and to compute an output based on the operands and one of a plurality of ALU operations; and a result register to store the output of the ALU; and a controller to: receive, from a host processor, operands and an instruction; determine, based on the instruction, a data layout; supply the operands to the DRAM banks in accordance with the data layout; and control an IMC module to perform one of the ALU operations on the operands in accordance with the instruction.

24 Claims, 15 Drawing Sheets

Related U.S. Application Data

(60) Provisional application No. 62/975,577, filed on Feb. 12, 2020.

(52) U.S. Cl.
CPC ........ *G06F 9/3016* (2013.01); *G06F 9/30036* (2013.01); *G06F 9/30098* (2013.01)

(58) Field of Classification Search
CPC ...... G06F 3/0604; G06F 3/061; G06F 3/0656; G06F 3/0658; G06F 3/0659; G06F 9/30101; G06F 9/44557; G06T 1/60; G11C 11/4096
See application file for complete search history.

(56) References Cited

U.S. PATENT DOCUMENTS

| | | | |
|---|---|---|---|
| 9,542,101 B2* | 1/2017 | Simionescu | G06F 3/064 |
| 10,185,499 B1* | 1/2019 | Wang | G06F 3/0673 |
| 10,691,182 B2 | 6/2020 | Steely, Jr. et al. | |
| 2010/0026697 A1* | 2/2010 | Xiang | H04N 19/61 |
| | | | 345/564 |
| 2010/0312999 A1 | 12/2010 | Walker | |
| 2016/0224465 A1 | 8/2016 | Morad et al. | |
| 2016/0378351 A1 | 12/2016 | Colgrove et al. | |
| 2018/0032437 A1* | 2/2018 | Stocksdale | G06F 12/0893 |
| 2019/0042542 A1 | 2/2019 | Narayanamoorthy et al. | |
| 2019/0205737 A1 | 7/2019 | Bleiweiss et al. | |
| 2019/0213005 A1 | 7/2019 | Teman et al. | |
| 2019/0310911 A1* | 10/2019 | Sundaram | G06F 11/1048 |

\* cited by examiner

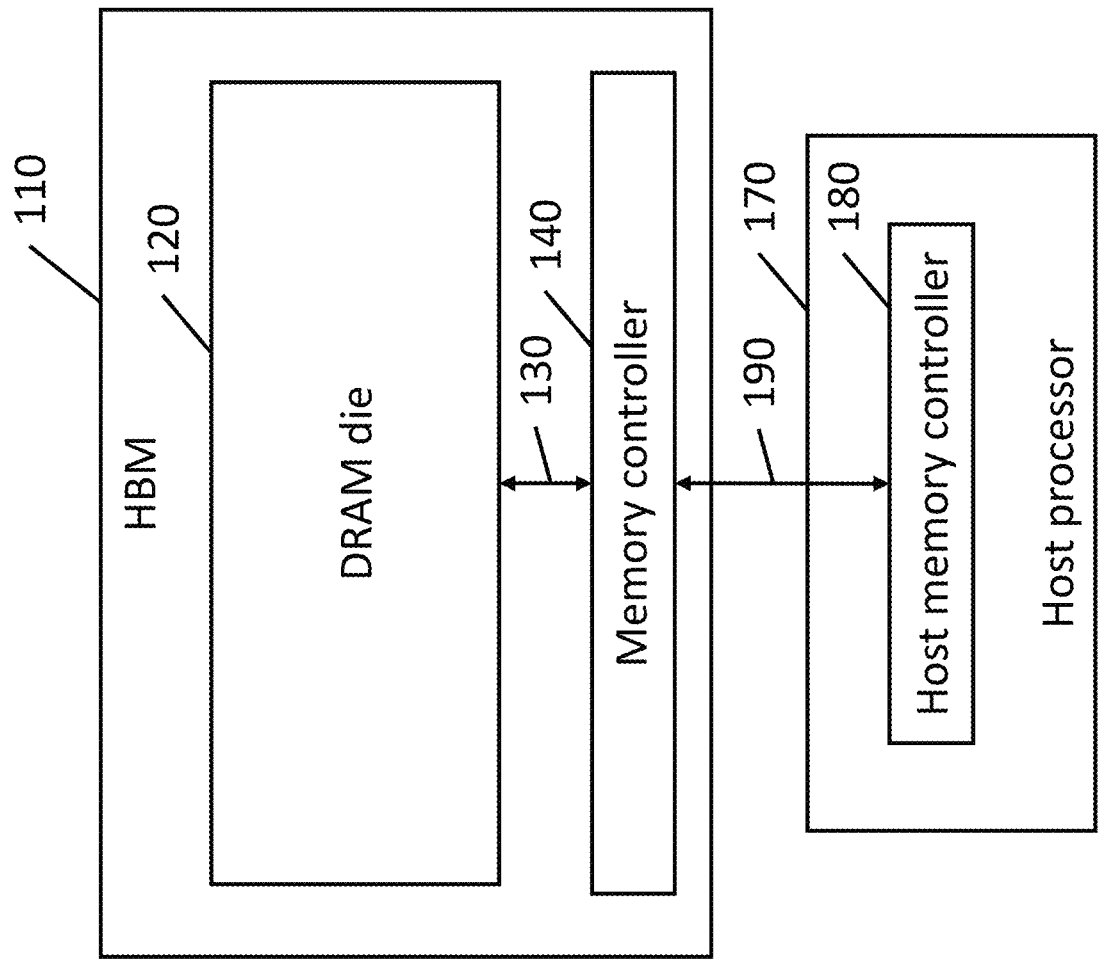

SYSTEMS AND METHODS FOR DATA PLACEMENT FOR IN-MEMORY-COMPUTE

CROSS-REFERENCE TO RELATED APPLICATION(S)

This application is a continuation of U.S. patent application Ser. No. 16/859,829, filed Apr. 27, 2020, which claims priority to, and the benefit of, U.S. Provisional Patent Application No. 62/975,577, filed in the United States Patent and Trademark Office on Feb. 12, 2020, the entire contents of both of which are incorporated herein by reference.

FIELD

Aspects of embodiments of the present disclosure relate to systems and methods for data placement for in-memory compute.

BACKGROUND

High Bandwidth Memory (HBM) is often used as high performance memory for graphics processing units (GPUs). HBM has the advantage of having a very wide bus in comparison to typical DRAM. Current HBM architecture includes multiple stacked DRAM dies (e.g. dice) which may be connected using through silicon vias (TSVs) and a logic die that functions as a buffer in the HBM and a HBM memory controller in the GPU. Further performance gains may be achieved by adding process in memory (e.g. in-memory processing) capabilities to memory systems.

The above information is only for enhancement of understanding of the background of embodiments of the present disclosure, and therefore may contain information that does not constitute prior art.

SUMMARY

Aspects of embodiments of the present disclosure relate to systems and methods for data placement for in-memory compute.

According to one embodiment of the present disclosure, a memory module includes: a memory die including a plurality of dynamic random access memory (DRAM) banks, each of the DRAM banks including: an array of DRAM cells arranged in a plurality of pages, each page including a plurality of DRAM cells, each cell storing a bit value; a row buffer configured to store values of an open page of the plurality of pages; an input/output (IO) module; and an in-memory compute (IMC) module including: an arithmetic logic unit (ALU) configured to receive operands from the row buffer or the IO module and to compute an output based on the operands and a selected ALU operation of a plurality of ALU operations; and a result register configured to store the output computed by the ALU; and a memory controller configured to: receive, from a host processor, a first operand, a second operand, and an instruction; determine, based on the instruction, a data layout from a plurality of data layouts; supply the first operand and the second operand to the DRAM banks in accordance with the data layout; and control an IMC module of the DRAM banks to perform an ALU operation of the plurality of ALU operations on the first operand and the second operand in accordance with the instruction.

The data layouts may include: a one operand (1OP) data layout, wherein the first operand is written to the DRAM cells and the second operand is supplied directly from the host processor to the IMC modules of the DRAM banks.

The IMC module may further include an operand register, and the memory controller may be further configured to: store a first tile of the first operand in the operand register; and perform the ALU operation on the first operand stored in the operand register and each of a plurality of second tiles of the second operand.

The first operand may be divided into a plurality of first tiles and the second operand is divided into a plurality of second tiles, each tile including a plurality of values, and wherein the data layouts may include a same page (SR) data layout, wherein the memory controller stores one or more of the first tiles and one or more of the second tiles in a same page of the DRAM cells.

The IMC module may further include an operand register, and the memory controller may be further configured to: store a first tile of the one or more of the first tiles in the operand register; and perform the ALU operation on the first operand stored in the operand register and each of the one or more second tiles stored in the same page of the array of DRAM cells as the first tile.

The IMC module of at least one DRAM bank may further include an accumulator, the accumulator including an accumulator register configured to store an accumulated value, the accumulator being configured to: receive the output computed by the ALU; and update the accumulator register with the sum of the accumulated value and the output, and the instruction may include computing an inner product of the first operand and the second operand, wherein the first tile of the first tiles stores row data and a second tile of the second tiles includes column data.

The first tile may have a first number of values and the second tile has a second number of values, the IMC module of at least one DRAM bank may include an output buffer, the output buffer having a size for storing greater than or equal to the product of the first number of values and the second number of values, and the instruction may include computing an outer product of the first operand and the second operand, wherein the first tile of the first tiles stores row data and a second tile of the second tiles includes column data.

The first tile may have a first number of values and the second tile may have a second number of values, the IMC module of at least one DRAM bank may include an output buffer, the output buffer having a size for storing greater than or equal to the larger of the first number of values and the second number of values, and the instruction may include computing a tensor product of the first operand and the second operand, wherein the first tile of the first tiles stores row data and a second tile of the second tiles includes column data.

The first operand may be divided into a plurality of first tiles and the second operand may be divided into a plurality of second tiles, each tile including a plurality of values, and the data layouts may include a different page (DR) data layout wherein the memory controller stores a subset of the first tiles in a first page of the array of DRAM cells and a subset of the second tiles in a second page of the array of DRAM cells.

The IMC module may further include an operand register, and the memory controller may be further configured to: store a first tile of the first operand from the first page in the operand register; and perform the ALU operation on the first operand stored in the operand register and each of a plurality of second tiles of the second operand from the second page.

The IMC module of each DRAM bank may further include a hardware buffer configured to buffer the output computed by the ALU.

The hardware buffer may be at least four times the size of the result register.

The IMC module of each DRAM bank may further include an accumulator, the accumulator including an accumulator register configured to store an accumulated value, the accumulator being configured to: receive the output computed by the ALU; and update the accumulator register with the sum of the accumulated value and the output.

The memory module may be a high bandwidth memory (HBM) module including a stack of memory dies connected by through silicon vias, the plurality of memory dies including the memory die.

According to one embodiment of the present disclosure, a method for performing computations in-memory includes: receiving, by a memory controller of a memory module, a first operand, a second operand, an instruction; determining, by the memory controller, based on the instruction, a data layout from a plurality of data layouts; supply the first operand and the second operand to one or more dynamic random access memory (DRAM) banks of the memory module in accordance with the data layout, each of the DRAM banks including: an array of DRAM cells arranged in a plurality of pages, each page including a plurality of DRAM cells, each cell storing a bit value; a row buffer configured to store values of an open page of the plurality of pages; an input/output (IO) module; and an in-memory compute (IMC) module including: an arithmetic logic unit (ALU) configured to receive operands from the row buffer or the IO module and to compute an output based on the operands and a selected ALU operation of a plurality of ALU operations; and a result register configured to store the output computed by the ALU; and control the IMC module of the DRAM banks to perform an ALU operation of the plurality of ALU operations on the first operand and the second operand in accordance with the instruction.

The data layouts may include: a one operand (1OP) data layout, wherein the first operand is written to the DRAM cells and the second operand is supplied directly from the host processor to the IMC modules of the DRAM banks.

The IMC module may further include an operand register, and the memory controller may be further configured to: store a first tile of the first operand in the operand register; and perform the ALU operation on the first operand stored in the operand register and each of a plurality of second tiles of the second operand.

The first operand may be divided into a plurality of first tiles and the second operand is divided into a plurality of second tiles, each tile including a plurality of values, and the data layouts may include a same page (SR) data layout, wherein the memory controller stores one or more of the first tiles and one or more of the second tiles in a same page of the DRAM cells.

The IMC module may further include an operand register, and the memory controller may be further configured to: store a first tile of the one or more of the first tiles in the operand register; and perform the ALU operation on the first operand stored in the operand register and each of the one or more second tiles stored in the same page of the array of DRAM cells as the first tile.

The IMC module of at least one DRAM bank may further include an accumulator, the accumulator including an accumulator register configured to store an accumulated value, the accumulator being configured to: receive the output computed by the ALU; and update the accumulator register with the sum of the accumulated value and the output, and wherein the instruction includes computing an inner product of the first operand and the second operand, wherein the first tile of the first tiles stores row data and a second tile of the second tiles includes column data.

The first tile may have a first number of values and the second tile may have a second number of values, the IMC module of at least one DRAM bank may include an output buffer, the output buffer having a size for storing greater than or equal to the product of the first number of values and the second number of values, and the instruction may include computing an outer product of the first operand and the second operand, wherein the first tile of the first tiles stores row data and a second tile of the second tiles includes column data.

The first tile may have a first number of values and the second tile may have a second number of values, the IMC module of at least one DRAM bank may include an output buffer, the output buffer having a size for storing greater than or equal to the larger of the first number of values and the second number of values, and the instruction may include computing a tensor product of the first operand and the second operand, wherein the first tile of the first tiles stores row data and a second tile of the second tiles includes column data.

The first operand may be divided into a plurality of first tiles and the second operand is divided into a plurality of second tiles, each tile including a plurality of values, and the data layouts may include a different page (DR) data layout wherein the memory controller stores a subset of the first tiles in a first page of the array of DRAM cells and a subset of the second tiles in a second page of the array of DRAM cells.

The IMC module may further include an operand register, and the memory controller may be further configured to: store a first tile of the first operand from the first page in the operand register; and perform the ALU operation on the first operand stored in the operand register and each of a plurality of second tiles of the second operand from the second page.

BRIEF DESCRIPTION OF THE DRAWINGS

The accompanying drawings, together with the specification, illustrate exemplary embodiments of the present invention, and, together with the description, serve to explain the principles of the present invention.

FIG. 1 is a block diagram of an architecture of a high-bandwidth memory (HBM) system according to an embodiment of the present disclosure.

DETAILED DESCRIPTION

Figure 2B:
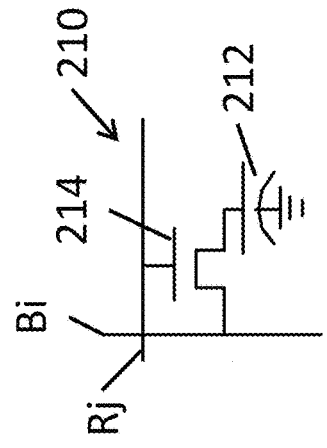
FIG. 2B is a circuit diagram illustrating an example of a DRAM cell according to one embodiment of the present disclosure.

Features of the disclosed concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, in some circumstances, various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Some aspects embodiments of the present disclosure relate generally to the management of the placement of data in memory in the context of in-memory-compute. One example of a context for in-memory-compute is in a high-bandwidth memory (HBM) system that includes a dynamic random access memory (DRAM) die containing memory and an arithmetic logic unit (ALU) and a memory controller on a HBM logic die, where the ALU on the HBM logic die can perform in-memory computations. The memory controller of the HBM controls the storage of data into the memory of the DRAM die and the reading of the data from the DRAM die.

For the sake of clarity, as used herein, the term "in-memory computation" refers to performing computations within a memory module, such as a high-bandwidth memory module, using data stored in the DRAM die, without traversing an external data bus. In a comparative computer system, a processor may be coupled to main memory (e.g., DRAM) via an external DRAM data bus, and accessing data from main memory is significantly slower (e.g., a few orders of magnitude slower) than accessing data in a register file within the processor and/or data in hardware caches (e.g., L1 cache, L2 cache) that are closer to the processor. By placing an additional processor at or near the memory (e.g., an "in-memory processor") the latency due to traversing an external bus can be avoided, thereby resulting in higher performance computations.

Aspects of embodiments of the present disclosure relate to placing computational circuitry such as ALUs on the same die as the DRAM banks, e.g., directly connected to sense amplifiers or row buffers of respective DRAM banks.

Due to the design and performance characteristics of DRAM modules, the particular arrangement of the data in the memory may affect the performance of in-memory computations. Accordingly, some aspects of embodiments of the present disclosure relate to systems and methods for placing data within the DRAM modules of a memory module (e.g., an HBM memory module), where the placement of the data may be controlled based on characteristics of computations to be performed by the in-memory compute (IMC) module.

FIG. 1 is a block diagram of an architecture of a memory (e.g., HBM) system according to an embodiment of the present disclosure.

Referring to FIG. 1, embodiments of the present disclosure provide a system for a function-in-memory (FIM) memory system 100. The memory system 100 (or HBM system) supports additional computational resources to be integrated in the memory module (or HBM module) 110. For example, in various embodiments, the memory system 100 allows for some data computations and movements to be performed in-memory, and also provides a high-capacity memory scratchpad. The memory system 100 includes at least one memory module 110 connected to a host processor 170 such as graphics processing unit (GPU) or a central processing unit (CPU). In various embodiments, the memory module 110 includes one or more dynamic random access memory (DRAM) dies 120 connected via an internal memory bus 130 to a memory controller 140 (e.g., on a logic die). In various embodiments, the host processor 170 includes a host memory controller (or host controller) 180 for interfacing with the memory module 110. However, embodiments of the present disclosure are not limited thereto. For example, the host memory controller 180 may be separate from the host processor 170 (e.g., on a separate die or on the same die as the host processor 170).

According to various embodiments, the memory controller 140 is configured to coordinate the execution of instructions from the host processor 170. The instructions may include both regular instructions and FIM instructions. For example, regular instructions (e.g. traditional load and store functions, not function-in-memory instructions) are sent by the host memory controller 180 and received by the memory controller 140 and executed in a conventional manner. For example, regular instructions may include instructions to store data received over the external bus 190 in the DRAM dies 120 and instructions to retrieve data from the DRAM dies 120 and transfer the data to the host processor 170 via the external bus 190. In some embodiments, the regular instructions and the FIM instructions may include operations for storing data in particular locations (e.g., particular pages of particular banks) in the DRAM dies. These data may include two different operands, where each operand may include multiple values (e.g., floating point or integer values), and, as discussed in more detail below, the values of these operands may be distributed across different locations of the DRAM dies in accordance with various data placement strategies.

Aspects of embodiments of the present disclosure relate to the use of in-memory compute (IMC). Some comparative HBM systems include an arithmetic logic unit (ALU) external to the DRAM die 120 (e.g., located at the memory controller 140) and shared by the memory banks of the DRAM die 120 such that the ALU can perform operations (e.g., arithmetic operations) on the data stored in the one or more DRAM dies 120 without traversing the external bus 190. For example, the memory controller 140 may execute data movement operations (e.g. a load/store pair instructions) to move or copy data between different parts of the DRAM die 120. For example, a memory controller may execute FIM instructions that were originally a plurality of regular instructions, such as by coordinating the execution of computational FIM instructions that utilize the ALU (e.g. atomic instructions and ALU instructions). As another example, in some cases, the FIM instructions received from the host processor 170 cause the memory module with integrated IMC to perform a particular computation such as computing an inference, based on a supplied input, using a trained machine learning model (e.g., a neural network), to perform backpropagation during the training of a neural network, or to multiply two matrixes. In these cases, the memory controller 140 may coordinate the execution of these instructions by storing received data (e.g., operands of the instruction) in particular pages of the DRAM banks and by providing particular ALU operations to DRAM banks that store data relevant to the FIM instruction. The memory controller 140 may place the received data (the operands) in particular pages of the DRAM banks in a manner that improves the performance of the computation when executing the particular FIM instruction. The result is then stored in the DRAM die 120 or may be returned to the host processor 170 via the external bus 190.

Some aspects of embodiments of the present disclosure relate to accelerating memory bounded operations by integrating in-memory compute (IMC) modules into the memory banks of the DRAM dies 120, thereby avoiding traversal of an internal memory bus 130 between the DRAM dies 120 and the memory controller 140. For example, the IMC modules are on the same physical semiconductor dies as the DRAM banks holding the data. Each DRAM bank may have an associated IMC module such that computations can be performed on data stored in the DRAM bank without traversing the internal memory bus 130 to the memory controller (e.g., without transferring the data out of the DRAM bank), while also enabling the computations to be parallelized across the IMC modules of the DRAM banks.

While aspects of embodiments of the present disclosure will be described in the context of high bandwidth memory, embodiments are not limited thereto and may also be applicable to integrating IMC modules into DRAM dies in other types of DRAM systems.

Figure 2C:
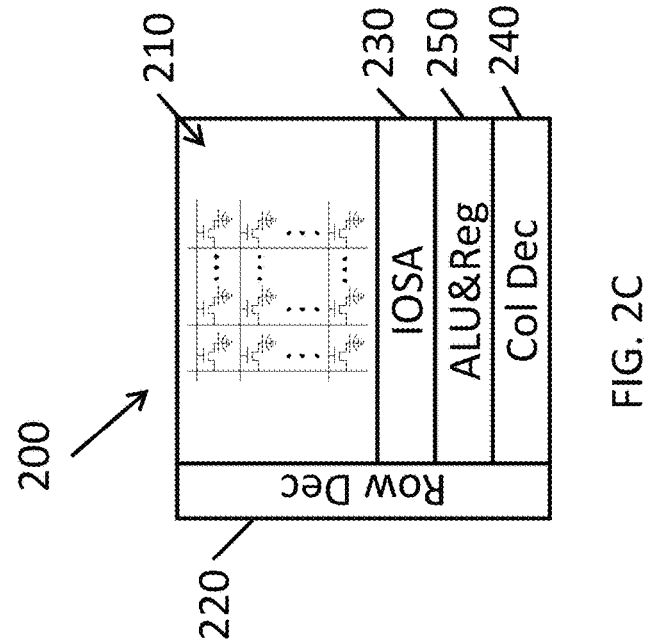
FIG. 2C is a schematic diagram of a DRAM block according to one embodiment of the present disclosure.
Figure 2A:
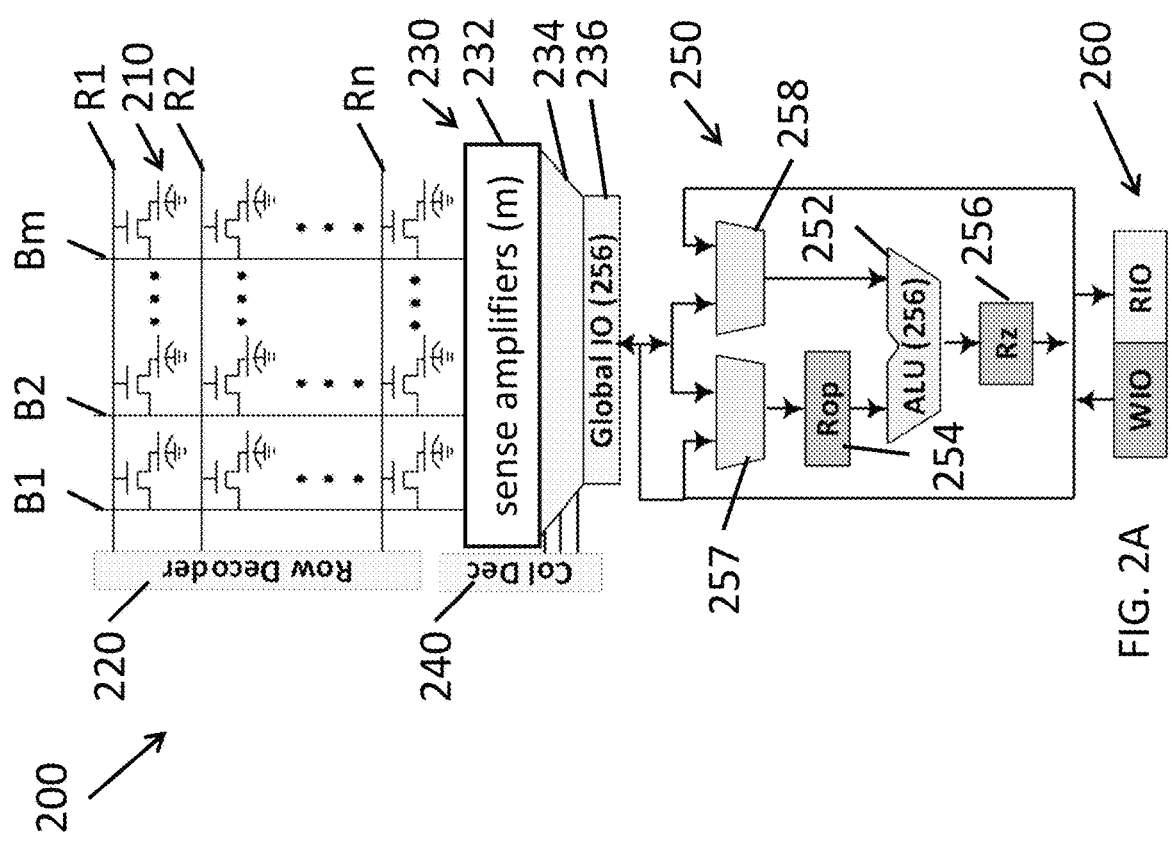
FIG. 2A is a schematic block diagram of a bank of memory having embedded arithmetic logic units (ALUs) according to one embodiment of the present disclosure.

FIG. 2A is a schematic block diagram of a bank of memory having embedded arithmetic logic units (ALUs) according to one embodiment of the present disclosure. As shown in FIG. 2, a DRAM bank 200 includes an array of DRAM cells 210 arranged into rows and columns (or pages and columns). In the example shown in FIG. 2A, the DRAM bank 200 includes DRAM cells 210 arranged into n rows (or pages) and m columns. A plurality of bitlines B1 through Bm extend along the column direction, and a plurality of row enable lines R1 through Rn extend along the row direction of the array and cross the bitlines. Each of the bitlines is connected to every cell in its corresponding column (e.g., every cell in a i-th column of the array is connected to bitline Bi). Likewise, each of the row enable lines R1 through Rn is connected to each DRAM cell 210 in its corresponding row (e.g., every cell in an j-th row or page of the array is connected to row enable line Rj). A row of DRAM cells 210 of a DRAM bank 200 may also be referred to as a DRAM page.

FIG. 2B is a circuit diagram illustrating an example of a DRAM cell according to one embodiment of the present disclosure. Each DRAM cell 210 may generally be modeled as including a capacitor 212 for storing data voltages (e.g., bit values, where each capacitor may store a voltage representing a 0 bit or a voltage representing a 1 bit) and a switch 214 for transmitting data voltages to the capacitor 212. The particular DRAM cell 210 shown in FIG. 2B is in the i-th row and the j-th column of the array. Accordingly, the switch 214 of the DRAM cell 210 of FIG. 2B is connected between an i-th bitline Bi and one terminal of the capacitor 212, and the other terminal of the capacitor 212 is connected to ground. The gate electrode of the switch 214 of the DRAM cell 210 shown in FIG. 2B is connected to a j-th row enable line Rj, such that the capacitor 212 is connected to the bitline Bi when the switch 214 is turned on.

Referring back to FIG. 2A, a DRAM bank 200 includes a row decoder 220 that is connected to the row enable lines R1 through Rn and that is configured to supply a row enable signal to a particular one of the row enable lines corresponding to a row address supplied from, for example, the memory controller 140. When writing or reading data to a particular row r (or page) of the DRAM cells, the row decoder 220 supplies a row enable signal to the row enable line corresponding to the particular row (or page). When writing data, voltages corresponding to the data to be written are supplied to the bitlines B1 through Bm while a particular row or page is enabled. Similarly, when reading data from a particular row or page of the array of DRAM cells 210, voltages corresponding to the voltages stored in the capacitors 212 are transmitted along the bitlines B1 through Bm and read by an input/output sense amplifiers layer 230 (or IOSA), which includes sense amplifiers 232. Each sense amplifier of the sense amplifiers 232 is connected to a corresponding one of the bitlines (e.g., the sense amplifiers 232 include m sense amplifiers). For example, in some embodiments, the array of DRAM cells 210 includes 8,192 columns, and 8,192 corresponding bitlines (e.g., bitlines B1 through B8192) connected to 8,192 corresponding sense amplifiers 232 (e.g., each page may store 8,192 bits or 8 Kibit of data). The sense amplifiers 232 may also be referred to as a "row buffer," because the sense amplifiers 232 store the data read from the current row (or page) until they are cleared by a "precharge" command.

A column decoder 240 may be used to select a subset of the columns of data using a multiplexer 234, and the data that is read may be supplied to an in-memory compute (IMC) module 250, through a global IO layer 236, for performing computations on the data. For example, in some embodiments, the column decoder 240 and the multiplexer 234 may allow the selection of 256 bits (256b) of data from the 8,192 columns of DRAM cells 210.

When loading data from a page of a DRAM bank 200 that is different from the page that is currently stored in the sense amplifiers 232, a "precharge" (PRE) command is used to close the current page and to prepare the DRAM bank 200 for the next access. An "activate" (ACT) command is then used to open a particular row or page of the bank and then store that data in the sense amplifiers 232. The data may then be read (READ) from the sense amplifiers 232 to be transferred to the IMC module 250.

On the other hand, when loading data into the IMC module 250 from a page that is already open, then a READ command may be sufficient to load the data, such as by selecting an appropriate subset of the data already stored in the sense amplifiers 232 using the column decoder 240 (the PRE and ACT commands may be skipped).

According to various embodiments, the IMC module 250 (or ALU&Reg) includes an arithmetic logic unit (ALU) 252 and one or more registers. In the embodiment shown in FIG. 2A, the IMC module 250 includes an operand register Rop 254 (or input buffer) and a result register Rz 256. Multiplexers 257 and 258 may be used to control the flow of data to the two inputs of the ALU 252 (e.g., as a first operand and second operand to the ALU 252). For example, in the embodiment shown in FIG. 2A, the operand register Rop 254 is connected to the first operand input of the ALU 252, and the first multiplexer 257 is connected to write data to the operand register Rop 254 from either the sense amplifiers 232 through global IO layer 236 or from an external source (e.g., the host processor) through an input-output (IO) module 260 (or write input/output and read input/output or WIO and RIO). In the embodiment shown in FIG. 2A, second multiplexer 258 is configured to supply data directly to the second operand input of the ALU 252, again either from the sense amplifiers 232 through global IO layer 236 or from an external source through the IO module 260. The ALU 252 may output its computations to the result register Rz 256, and the data may be written from the result register Rz 256 back into the DRAM cells 210 through the global IO layer 236 or transmitted out to the host processor 170 through the IO module 260 (or WIO and RIO).

According to some embodiments, ALU 252 is configured for executing various computational operations (e.g. simple compute commands). For example, the ALU 252 may be a 16-bit ALU, a 32-bit ALU, or a 64-bit ALU configured to execute arithmetic operations, bitwise, shift operations, and the like. In various embodiments, the ALU 252 may include circuitry to perform integer operations, floating point operations, or both. For example, the ALU 252 may be configured to execute arithmetic operations such as ADD (+), SUBTRACT (−), MULTIPLY (*), and DIVIDE (÷), bitwise operations such as AND (&), OR (|), XOR (^), and NOT (~) operations, and tensor operations. Furthermore, in some embodiments, the ALU 252 may implement single instruction, multiple data (SIMD) or vector instructions for performing operations on vectors of data in parallel. Examples of vector operations implemented by an ALU 252 according to embodiments of the present disclosure include dot product ( ) outer product (⊗), rectified linear unit (ReLU), square (vsSqr), and square root (vsSqrt). The ALU 252 may be utilized for atomic and non-atomic operations. Table 1, below, lists operations supported by an ALU 252 according to some embodiments of the present disclosure.

TABLE 1

| ID | operation | Description |
| --- | --- | --- |
| 0 | Rop = GIO | Column read data stored in Rop |
| 1 | Rop = WIO | Column write data stored in Rop |
| 2 | Rop = Rz | Copy ALU output Rz to Rop |
| 3 | GIO = Rz | Write back into Bank |
| 4 | RIO = GIO | Normal Read to DQ output |
| 5 | RIO = Rz | Drive Rz to DQ output |
| 6 | Rz = Rop (op) GIO | Operation with Rop and data from bank |
| 7 | Rz = Rop (op) WIO | Operation with Rop and broadcast data |
| 8 | Rz = WIO (op) GIO | Operation with broadcast data and bank |
| 9 | GIO = WIO | Normal Write from DQ Input |

FIG. 2C is a schematic diagram of a DRAM bank 200 according to one embodiment of the present disclosure, including an array of DRAM cells 210, a row decoder 220, an IOSA 230, an IMC module 250, and a column decoder 240, such as those discussed above.

Figure 3:
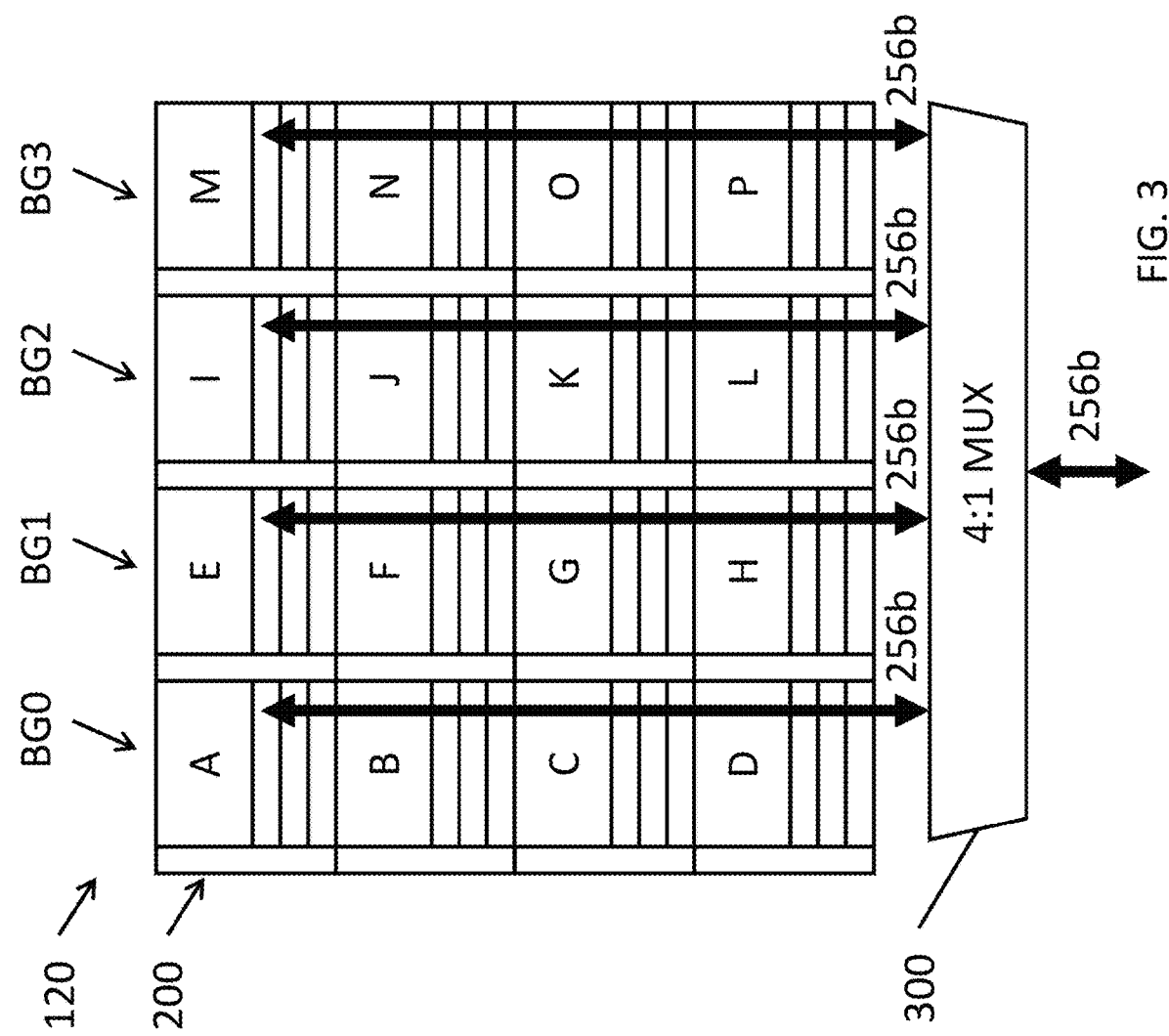
FIG. 3 is a schematic diagram of an array of DRAM blocks according to one embodiment of the present disclosure.

FIG. 3 is a schematic diagram of an array of DRAM blocks according to one embodiment of the present disclosure. In the embodiment shown in FIG. 3, sixteen DRAM banks 200 are arranged in a four by four array, and are labeled as DRAM banks A through P and arranged into four bank groups, labeled BG0 (including DRAM banks A, B, C, and D), BG1 (including DRAM banks E, F, G, and H), BG2 (including DRAM banks I, J, K, and L), and BG3 (including DRAM banks M, N, O, and P). As described above with respect to FIG. 2C, each DRAM bank 200 shown in FIG. 3 may include an IMC module 250 for performing computations within the DRAM dies 120 (e.g., without traversing an external bus). In addition, as shown in FIG. 3, the DRAM die 120 further includes a multiplexer 300 (e.g., a 4:1 multiplexer) configured to multiplex data from an external source (e.g., by way of a through-silicon via or TSV connecting the DRAM die 120 to multiple other stacked DRAM dies 120 and the memory controller 140) to the four columns of blocks. For example, the multiplexer 300 may broadcast a 256 bit (256b) data vector to every DRAM bank 200 or may be used to supply data vectors to particular columns (BG0, BG1, BG2, or BG3) of DRAM banks 200.

A memory system 100 that includes in-memory compute (IMC), such as the IMC module 250, integrated into the DRAM dies 120 accelerates the performance of memory bounded host operations, because data does not need to pass through the bottleneck of an external bus (e.g., bus 190) to perform the computations. However, IMC may still encounter compute overhead in the form of ALU pipelining and DRAM processes, as well as memory overheads in the form of data placement and DRAM timings.

Accordingly, aspects of embodiments of the present disclosure relate to systems and methods for placing data within the DRAM to avoid or reduce the impact of DRAM timing overheads in performing in-memory computations by the integrated IMC module 250. Some aspects of embodiments of the present disclosure relate to software and hardware co-design for achieving improved performance.

In various embodiments, the memory controller 140 provides operations and manages the input and output of data to and from the DRAM dies 120. Accordingly, some aspects of embodiments of the present disclosure relate to memory controllers 140 configured to place data within the DRAM dies 120 in accordance with instructions provided to the memory controller 140 of the memory system 100 by the host processor 170. For example, some aspects of embodiments of the present disclosure relate to providing application programming interfaces (APIs) for interacting with an HBM having in-memory compute and compilers (e.g., data compilers) that are configured to generate commands to control the memory controller 140 to place data in accordance with the calls made to the API when compiling or interpreting the source code of programs using the API. For example, the API may provide function calls for performing general matrix-matrix multiplication (GEMM), and the compiler may generate sequences of commands to control the memory controller 140 to place data representing the operand matrices into the DRAM dies 120 in a manner that improves performance over naïve placements of the data, based on factors including the operations to be performed on the data (e.g., inner products, outer products, matrix multiplication, and the like), the size of the data (e.g., whether the data fits within a page of memory). When software is written to make use of DRAM with IMC through the APIs, a complier or data compiler according to some embodiments of the present disclosure may transform at least some of the source code of the software into commands that are executed by the memory controller 140 to place the data in particular locations of the DRAM dies 120 and to control the IMC modules of the DRAM dies 120 to perform computations and to store the results.

For the sake of discussion, according to one embodiment, a 16-lane ALU can achieve a peak performance of 8 GFLOPS (giga floating point operations per second) of half-precision floating-point (FP-16) computations. (While performance of IMC modules according to embodiments of the present disclosure are described herein with respect to FLOPS, embodiments of the present disclosure are not limited to performing floating point operations, and the relative performance of various data layouts may be similar when performing, for example, integer operations.) Accordingly, an implementation of in-memory compute (IMC) according to one embodiment of the present invention using a stack of four dies (4H or 4-Hi) using the second generation high bandwidth memory standard (HBM2) can achieve 8 TFLOPS (tera floating point operations per second) of FP-16 computations (256 banks per die times a stack of 4 dies=1,024 banks, each bank having a corresponding 16-lane ALU).

The peak computational performance, as measured in TFLOPS, can vary under different data layout scenarios. In one case (denoted 2OP), two operands from outside the memory module 110 are fed to the in-memory compute ALU perfectly, and the results are buffered and accumulated perfectly, thereby resulting in the above-discussed 8 TFLOPS peak computational power.

In another case (denoted 1OP), one operand is fed from outside the HMB to the IMC perfectly while the second operand is read from a random location in the DRAM die 120. This results in reduced peak computational power of about 6.5 TFLOPS.

In a third case (denoted DR), both operands are located in different pages of the DRAM and the result is written back to the DRAM. In this scenario, the measured computational power of about 0.8 TFLOPS (e.g., an order of magnitude slower than the 2OP case).

In a fourth case (denoted SR), both operands are located in the same row or page of the DRAM blocks. This results in a significant improvement of performance, over the DR case, to about 3.3 TFLOPS.

Figure 4A:
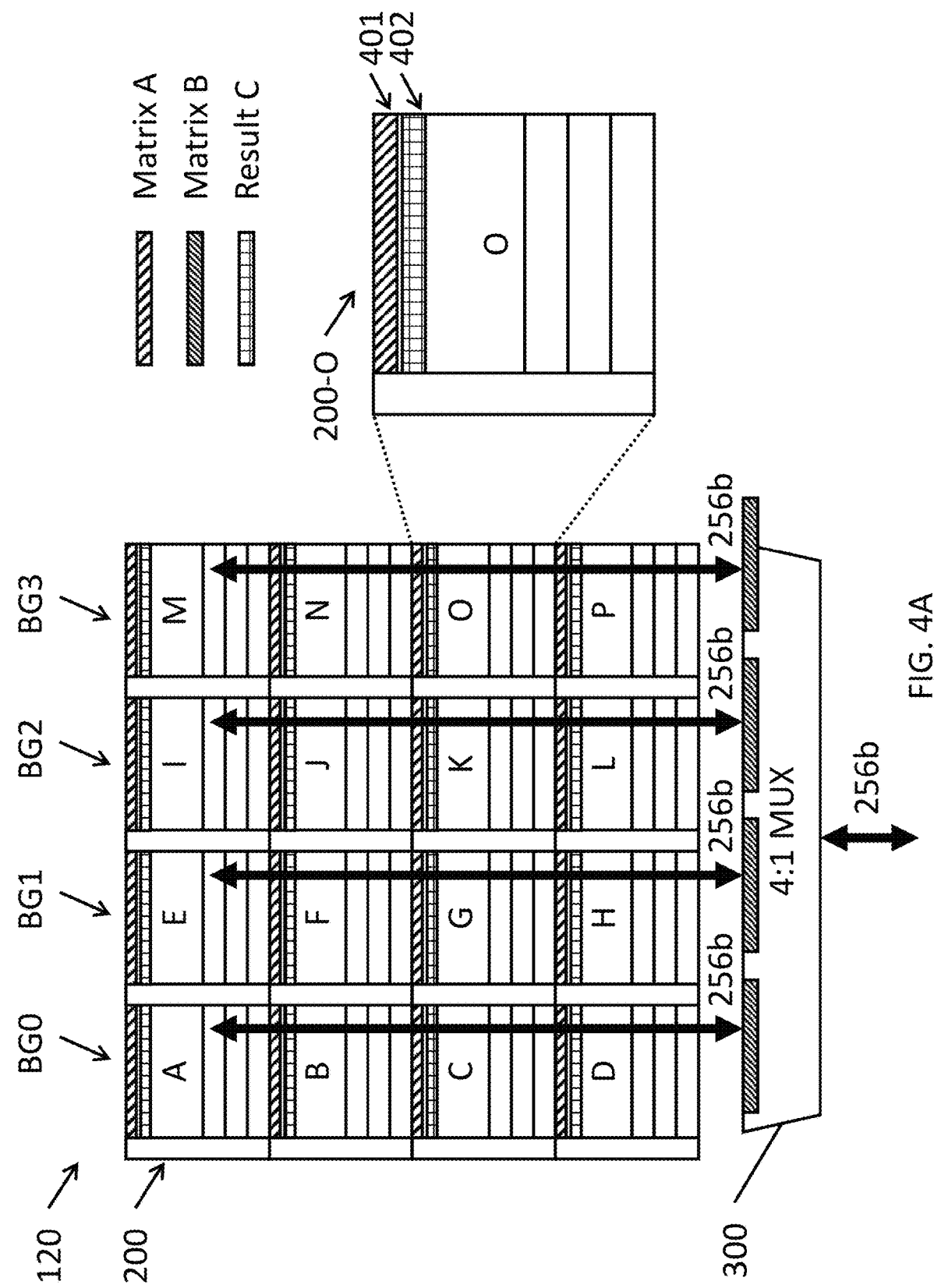
FIG. 4A schematically illustrates the placement of data for general matrix-matrix multiplication (GEMM) in the case where one operand (matrix A) is stored in the DRAM and the second operand (matrix B) is broadcast from outside a memory module with integrated in-memory compute (IMC) according to one embodiment of the present disclosure.

Accordingly, various data layout tradeoffs may be made based on considerations of the data. For example, when one operand is in the DRAM and the other operand is broadcast from outside the HBM in the 1OP case, performance is high (about 6.5 TFLOPS, as noted above), but this imposes an overhead on the host processor 170, which must supply the second operand to the HBM. FIG. 4A schematically illustrates the placement of data for general matrix-matrix multiplication (GEMM) in the case where one operand (matrix A) is stored in the DRAM and the second operand (matrix B) is broadcast from outside a memory module with integrated in-memory compute (IMC) according to one embodiment of the present disclosure. For the sake of illustration, DRAM bank 200-O is shown in more detail. As shown in FIG. 4A, data associated with first operand matrix A is placed in one page 401 (e.g., a first row or first page) of the DRAM bank 200-O, and the data associated with second operand matrix B is broadcast from outside the DRAM die 120 (e.g., via the multiplexer 300). The result C of the computation may be placed in a different page 402 of the DRAM bank 200-O.

Figure 4B:
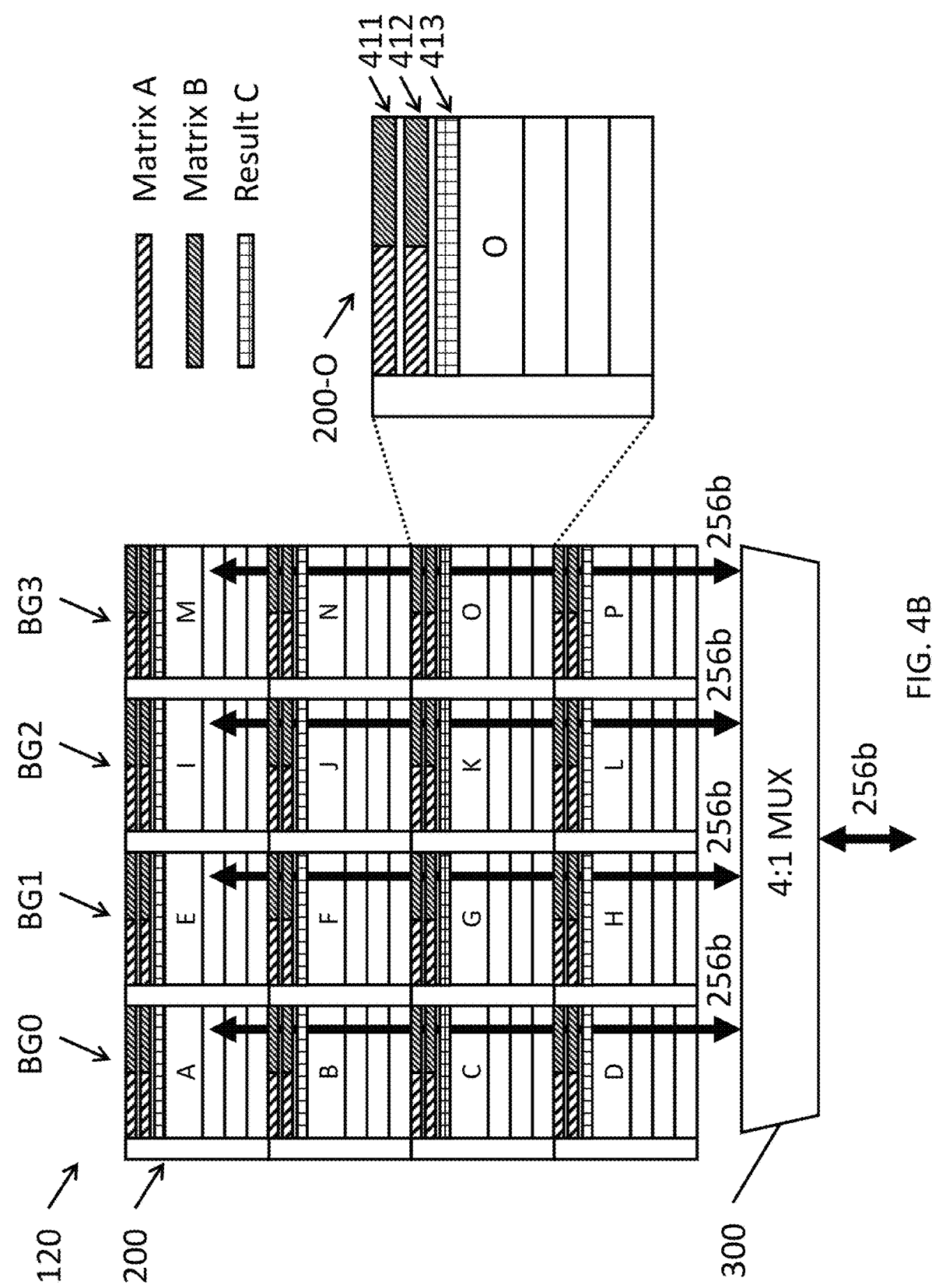
FIG. 4B schematically illustrates the placement of data for general matrix-matrix multiplication (GEMM) in the case where both operands (matrix A and matrix B) are stored in a same page of the DRAM of the memory module with integrated IMC according to one embodiment of the present disclosure.

When both operands are in the DRAM, placing the operands in the same page or same row (SR) improves computational power (e.g., to about 3.3 TFLOPS), in part by reducing the number of PRE and ACT operations that must be performed, as discussed in more detail below, but imposes more constraints regarding the placement of the data in the correct parts of the DRAM. FIG. 4B schematically illustrates the placement of data for general matrix-matrix multiplication (GEMM) in the case where both operands (matrix A and matrix B) are stored in a same page of the DRAM of the memory module with integrated IMC according to one embodiment of the present disclosure. For the sake of illustration, DRAM bank 200-O is shown in more detail. As shown in FIG. 4B, data associated with both the first operand matrix A and the second operand matrix B is placed in both page 411 (e.g., a first row or first page) of the DRAM bank 200-O. In more detail, the first half of page 411 is filled with data from the first operand matrix A and the second half of the first page 411 is filled with data from the second operand matrix B. Assuming the matrixes A and B are the same sizes as those described above with respect to FIG. 4A, additional pages may be needed to store the rest of the data. As such, data associated with both the first operand matrix A and the second operand matrix B are also placed in page 412. The result C of the matrix multiplication may then be stored in page 413 of the DRAM bank 200.

Figure 4C:
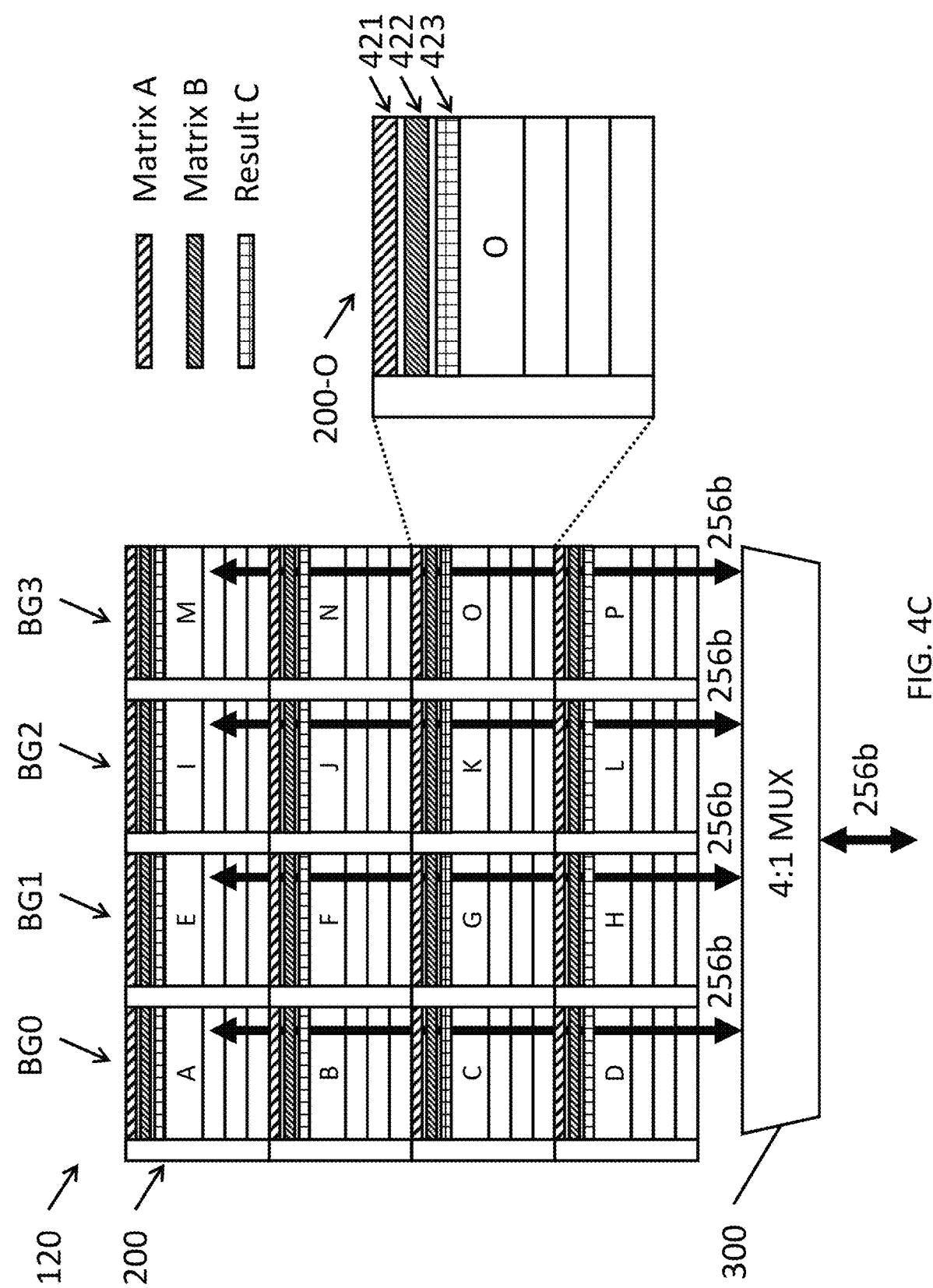
FIG. 4C schematically illustrates the placement of data for general matrix-matrix multiplication (GEMM) in the case where the two operands (matrix A and matrix B) are stored in different pages of the DRAM of the memory module with integrated IMC according to one embodiment of the present disclosure.

On the other hand, placing the operands in different pages is more flexible and reduces the constraints on layout (e.g., may be suitable for data having sizes that do not fit neatly into the fixed size pages of memory), but may generally come at the cost of reduced computational power. FIG. 4C schematically illustrates the placement of data for general matrix-matrix multiplication (GEMM) in the case where the two operands (matrix A and matrix B) are stored in different pages of the DRAM of the memory module with integrated IMC according to one embodiment of the present disclosure. For the sake of illustration, DRAM bank 200-O is shown in more detail. As shown in FIG. 4C, data from associated with the first operand matrix A is placed in page 421, data associated with second operand matrix B is placed in page 422, and the result C is placed in page 423.

The various performance impacts of the different data placement strategies (1OP, SR, and DR) discussed above with respect to FIGS. 4A, 4B, and 4C will be described in more detail below with respect to FIGS. 5A, 5B, 6A, 6B, 7A, and 7B. As shown in, for example, FIG. 5A, matrix A is a M by K matrix and matrix B is a K by N matrix, so the product of matrix A and matrix B, matrix C, has dimensions M by N. For the sake of discussion, the examples below depict the case where K=5, but embodiments of the present disclosure are not limited thereto. In accordance with standard matrix multiplication, an upper left value C00 of result matrix C is computed by the pairwise multiplication of the first row of matrix A (each of the positions Aij represents a vector or "tile" of, for example, sixteen half-precision floating point values in horizontal order, and FIGS. 5A, 5B, 6A, 6B, 7A, and 7B depict A00, A01, A02, A03, and A04) by the first column of matrix B (each of the positions Bij represents a vector or "tile" of, for example, sixteen half-precision floating point values in vertical order). In other words, C00 stores A00·B00+A01·610+A02·B20+A03·B30+A04·B40. In FIGS. 5A, 5B, 6A, 6B, 7A, and 7B, shading is used to identify operands that are multiplied together. In more detail, two operands that are shaded using the same pattern are multiplied together as part of the illustrated computations. While aspects of embodiments of the present disclosure are described in the context of an IMC configured to perform floating point operations on floating point operands, embodiments of the present disclosure are not limited thereto, and may also be applied to an IMC configured to perform, for example, integer operations on integer operands.

Figure 5A:
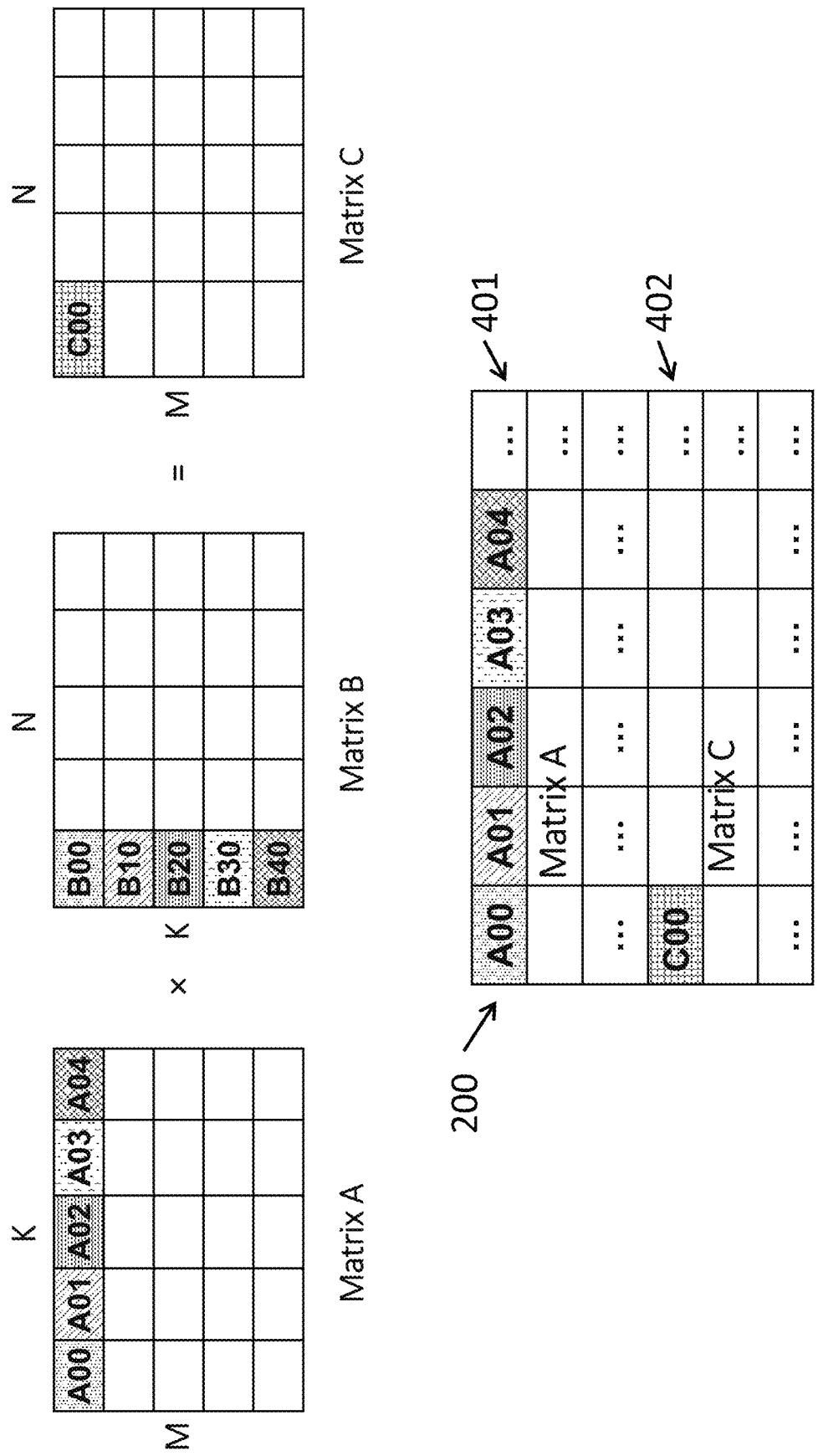
FIG. 5A is a schematic depiction of the multiplication of a first row of matrix A by a first column of matrix B in a one operand (1OP) data layout, where one operand is fed from outside and one operand is stored in a DRAM bank with integrated IMC according to one embodiment of the present disclosure.

FIG. 5A is a schematic depiction of the multiplication of a first row of matrix A by a first column of matrix B in a one operand (1OP) data layout, where one operand is fed from outside and one operand is stored in a DRAM bank with in-memory compute according to one embodiment of the present disclosure. As shown in FIG. 5A, the tiles A00, A01, A02, A03, and A04 of the first row of the matrix A are stored in a same row 401 of the DRAM bank 200, the vectors or tiles B00, B10, B20, B30, and B40 of the matrix B are supplied from the outside, and the results (e.g., C00) are stored in another page 402 of the DRAM bank 200.

The process of computing the product may start by computing A00·B00 by reading value A00 from DRAM bank 200. This will involve opening page 401, and therefore will require a precharge (PRE) command to prepare the sense amplifiers 232, followed by an activate (ACT) to load page 401 into the sense amplifiers 232, and a READ command to load the value of A00 from the sense amplifiers 232 into the IMC module 250. As noted above, B00 comes from the outside as input, and therefore no DRAM operations are needed to retrieve this value. The ALU 252 can then compute the product A00·B00 and store the temporary result in an output buffer (e.g., output register Rz).

Next, the ALU 252 computes the product A01·B10 by reading A01 from the DRAM. This also requires a PRE command, an ACT command, and a READ command. The vector or tile B10 is provided from the outside as input, and thus A01·B10 can then be computed and added to the temporary result in the buffer (e.g., output register Rz) storing the A00·B00. This process can then be repeated for the remaining values of matrix A and matrix B. As a result, each computation (e.g., multiplication of two operands such as tiles A00 and B00) requires one PRE, one ACT, and one READ per computation. As discussed in more detail below with respect to FIG. 8, in some embodiments, IMC further includes an accumulator configured to store a value and update the stored value with the sum of the previously stored value and a newly received value.

Figure 5B:
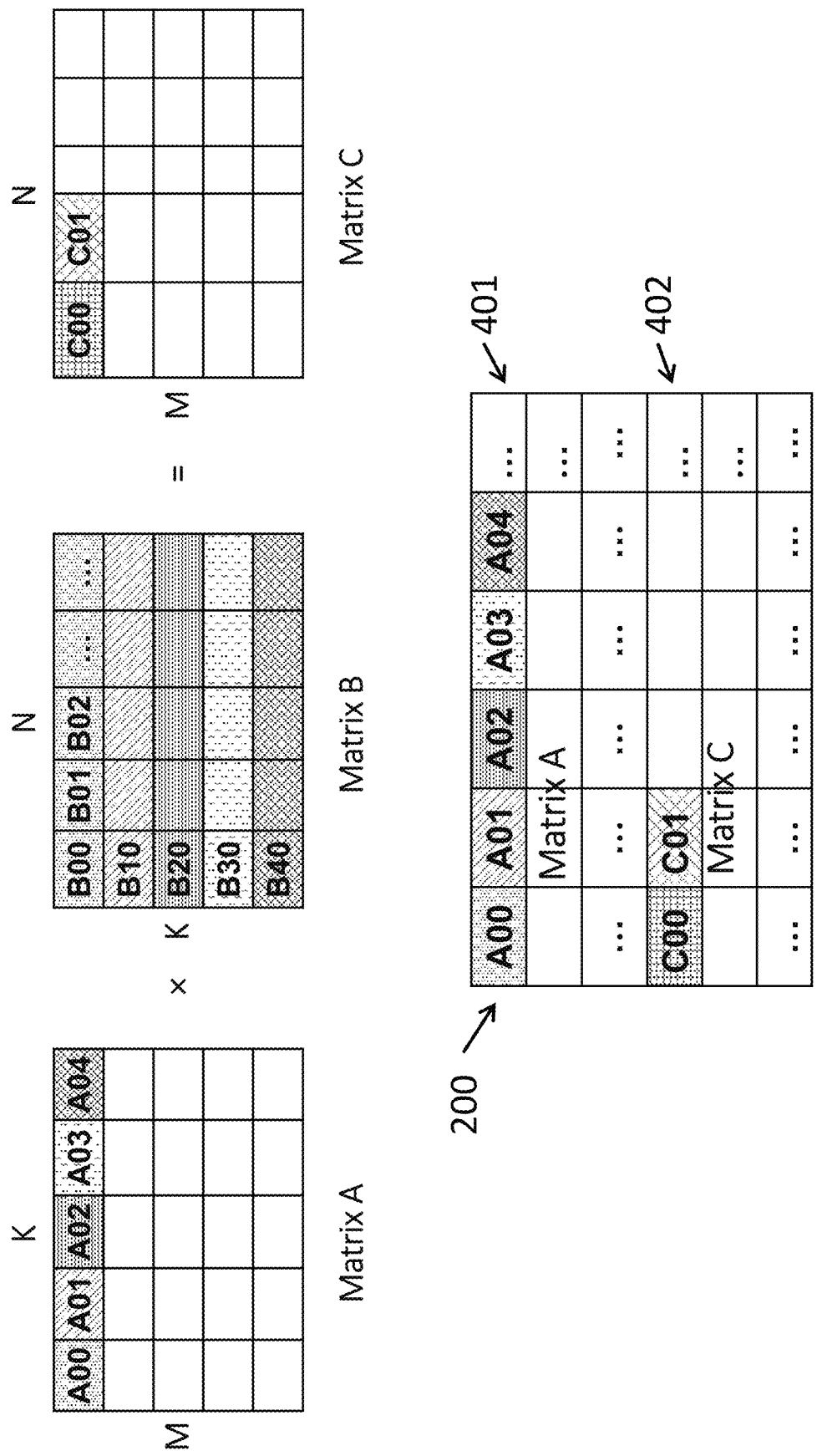
FIG. 5B is a schematic depiction of the multiplication, with data reuse, of a first value of a first row of matrix A by a first value of each column of matrix B in a 1OP data layout, where one operand is fed from outside and one operand is stored in a DRAM bank with integrated IMC according to one embodiment of the present disclosure.

FIG. 5B is a schematic depiction of the multiplication, with data reuse, of a first value of a first row of matrix A by a first value of each column of matrix B in a 1OP data layout, where one operand is fed from outside and one operand is stored in a DRAM bank with in-memory compute according to one embodiment of the present disclosure. The process shown in FIG. 5B differs from that shown in FIG. 5A in that the data loaded from DRAM is reused (e.g., stored in the operand register Rop 254) for different columns of matrix B. In particular, when multiplying two matrices, the j-th element of every row of matrix A is multiplied with every element of the j-th row of matrix B. Accordingly, by loading each element of matrix A once and multiplying it by all N columns of the matrix the cost of loading the data from the DRAM bank 200 is amortized across the N columns. In more detail, when multiplying matrix A by matrix B, as before, tile A00 may be read from the DRAM bank 200 using a PRE command, an ACT command, and a READ command, and tile B00 may be received from outside as input. The ALU 252 computes A00·B00 to compute a part of the sum for C00. However, rather than load tile A01 from the DRAM (e.g., using another PRE, ACT, and READ sequence), tile A00 may be used again and multiplied by B01 (received from the outside) to compute A00·B01, which is one of the products that is to be computed for C01. As a result, each computation requires 1/N PRE, 1/N ACT, and one READ per computation (because the PRE and ACT commands for loading another portion of matrix A can be amortized over the N columns of matrix B).

Figure 6A:
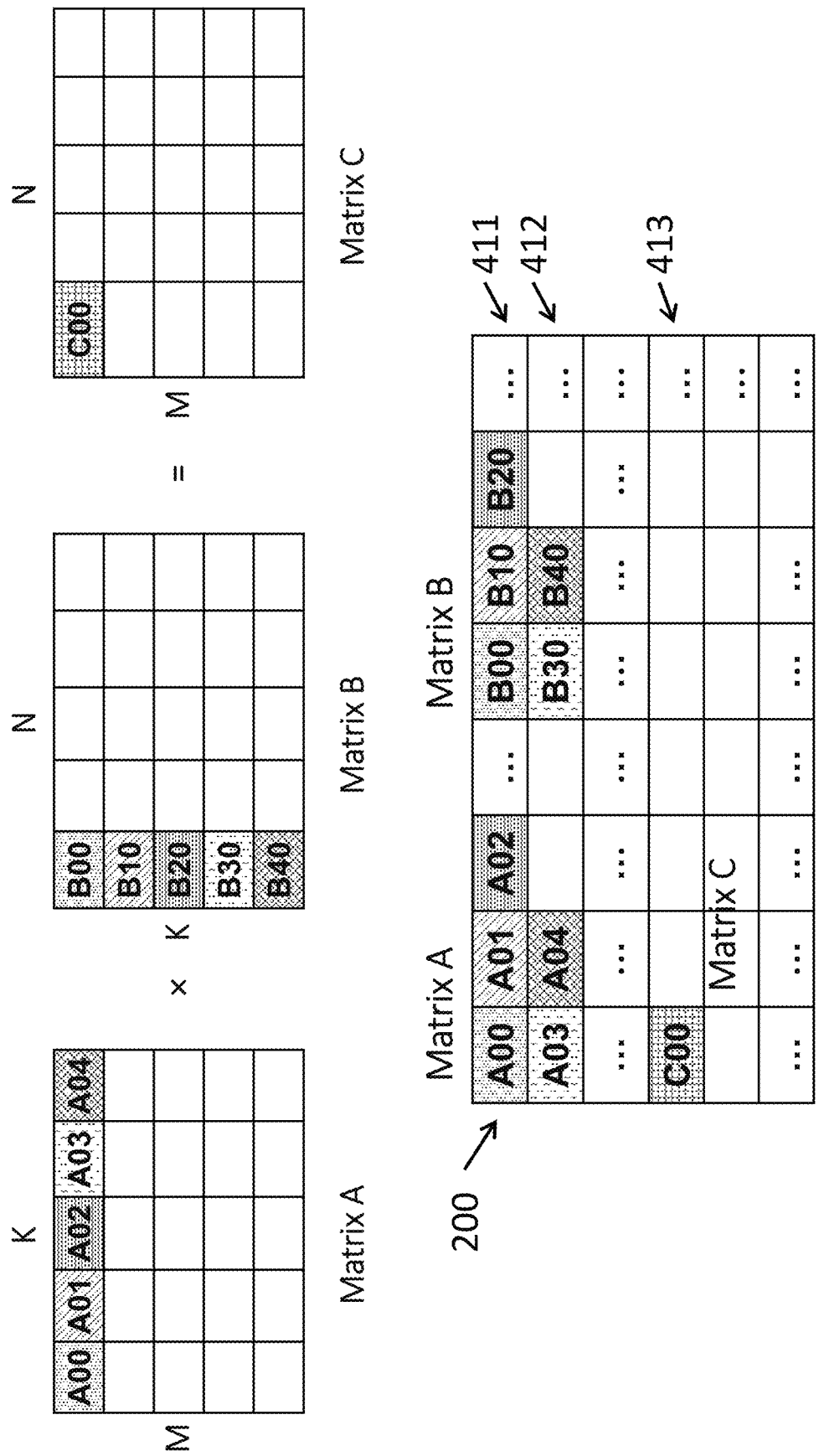
FIG. 6A is a schematic depiction of the multiplication of a first row of matrix A by a first column of matrix B in a same row (SR) data layout, where both operands are stored in a same page of a DRAM bank with integrated IMC according to one embodiment of the present disclosure.

FIG. 6A is a schematic depiction of the multiplication of a first row of matrix A by a first column of matrix B in a same row (SR) data layout, where both operands are stored in a same page of a DRAM bank with in-memory compute according to one embodiment of the present disclosure. As shown in FIG. 5A, the tiles A00, A01, and A02 of the first row of the matrix A and the tiles B00, B10, and B20 of the first row of the matrix B are stored in a same page 411 of the DRAM bank 200, and the tiles A03 and A04 of matrix A and the tiles B30 and B40 of matrix B are stored in a second page 412 of the DRAM bank 200. The results (e.g., C00) are stored in another page 413 of the DRAM bank 200.

The process of computing the result (e.g., inner product) may start by computing A00·B00 by reading tile A00 from DRAM bank 200. This will involve opening page 411, and therefore will require a precharge (PRE) command, followed by an activate (ACT) command, and a READ command to load the tile A00 from the sense amplifiers 232 into the IMC module 250. The tile B00 may then be read from the DRAM. However, because tile B00 is in the same page 411 as A00, its values are already stored in the sense amplifiers 232 and therefore, a READ command is sufficient (it is not necessary to further perform PRE and ACT to read tile B00 into the IMC module 250). Accordingly, the ALU 252 computes A00·B00 once the tiles A00 and B00 are read, and the temporary result can be stored in a buffer. Similarly, reading tiles A01 and B10 to compute A01·B10, likewise, can be performed using a READ command, without a PRE and an ACT because tiles A01 and B10 are both also in page 411 and therefore previously stored in the sense amplifiers 232 when page 411 was initially opened to read A00. Accordingly, each computation make take 1/r PRE, 1/r ACT, and 2 READ operations per compute, where r is the number of matching pairs of values that are stored in a same page of the DRAM bank 200. For example, as noted above, FIG. 6A depicts a case where the tiles A00, A01, and A02 of the first row of the matrix A and the tiles B00, B10, and B20 of the first row of the matrix B are stored in page 411 of the DRAM bank. Therefore, the computations A00·B00, A01·B10, and A02·B20 will each take (amortized) ⅓ PRE, ⅓ ACT, and 2 READ commands because page 411 contains three pairs of tiles (e.g., r=3). When computing A03·B30 and A04·B40, these computations will each take (amortized) ⅓ PRE, ⅓ ACT, and 2 READ commands because page 412 contains two pairs of values (e.g., r=2). This reduction in the number of PRE and ACT commands required per computation improves the performance of the overall computation.

Figure 6B:
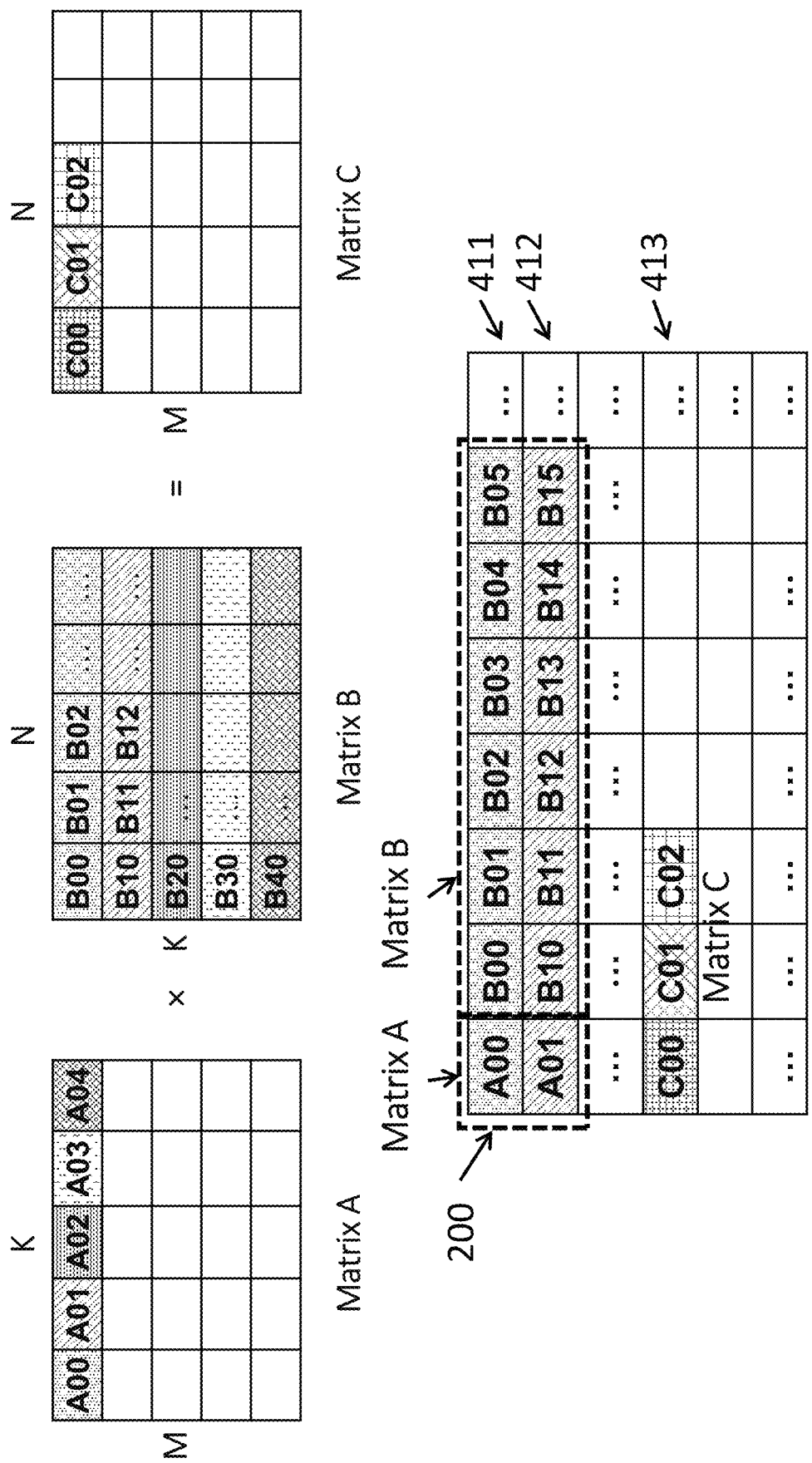
FIG. 6B is a schematic depiction of the multiplication, with data reuse, of a first value of a first row of matrix A by a first value of each column of matrix B in an SR data layout, where both operands are stored in a same page of a DRAM bank with integrated IMC according to one embodiment of the present disclosure.

FIG. 6B is a schematic depiction of the multiplication, with data reuse, of a first value of a first row of matrix A by a first value of each column of matrix B in an SR data layout, where both operands are stored in a same page of a DRAM bank with in-memory compute according to one embodiment of the present disclosure. In a manner similar to the comparison between the arrangements of FIGS. 5A and 5B, the computation process shown in FIG. 6B differs from that shown in FIG. 6A in that the values loaded from the DRAM are reused. In more detail, based on the understanding that matrix multiplication involves multiplying the i-th element of a given row of the first operand with the i-th element of each column of the second operand, the elements of matrix A and matrix B are arranged in the DRAM bank 200 such that the data for each element of a given row of matrix A is placed in the same page as the values of the row of matrix B that they will be multiplied with.

For example, as shown in FIG. 6B, when multiplying matrix A by matrix B, tile A00 of matrix A will be multiplied by the first tiles of every column of matrix B (every element of the first row of matrix B, e.g., B00, B01, B02, B03, B04, B05, . . . as shown in FIG. 6B) in the process of computing parts of the first row of result matrix C (e.g., as one of the terms of C00, C01, C02, C03, C04, C05, . . . ). Likewise, value A01 of matrix A will be multiplied by the second tiles of every column of matrix B (every element of the first row of matrix B, e.g., B10, B11, B12, B13, B14, B15, . . . as shown in FIG. 6B)

As such, at least one value of matrix A is stored in the same page as the corresponding values of matrix B. In the specific example shown in FIG. 6B, page 411 stores tile A00 from matrix A and tiles B00, B01, B02, B03, B04, B05, . . . from matrix B, and page 412 stores tile A01 from matrix A and tiles B10, B11, B12, B13, B14, B15, . . . from matrix B. Due to this arrangement of the data within the DRAM, assuming that a page of the DRAM can store at least N+1 entries, then each computation will take 1/N PRE commands, 1/N ACT commands, and (N+1)/N READ commands (because the PRE and ACT commands can be amortized over the N columns of matrix B). This reduction in the number of PRE and ACT commands required per computation improves the performance of the overall computation.

Figure 7A:
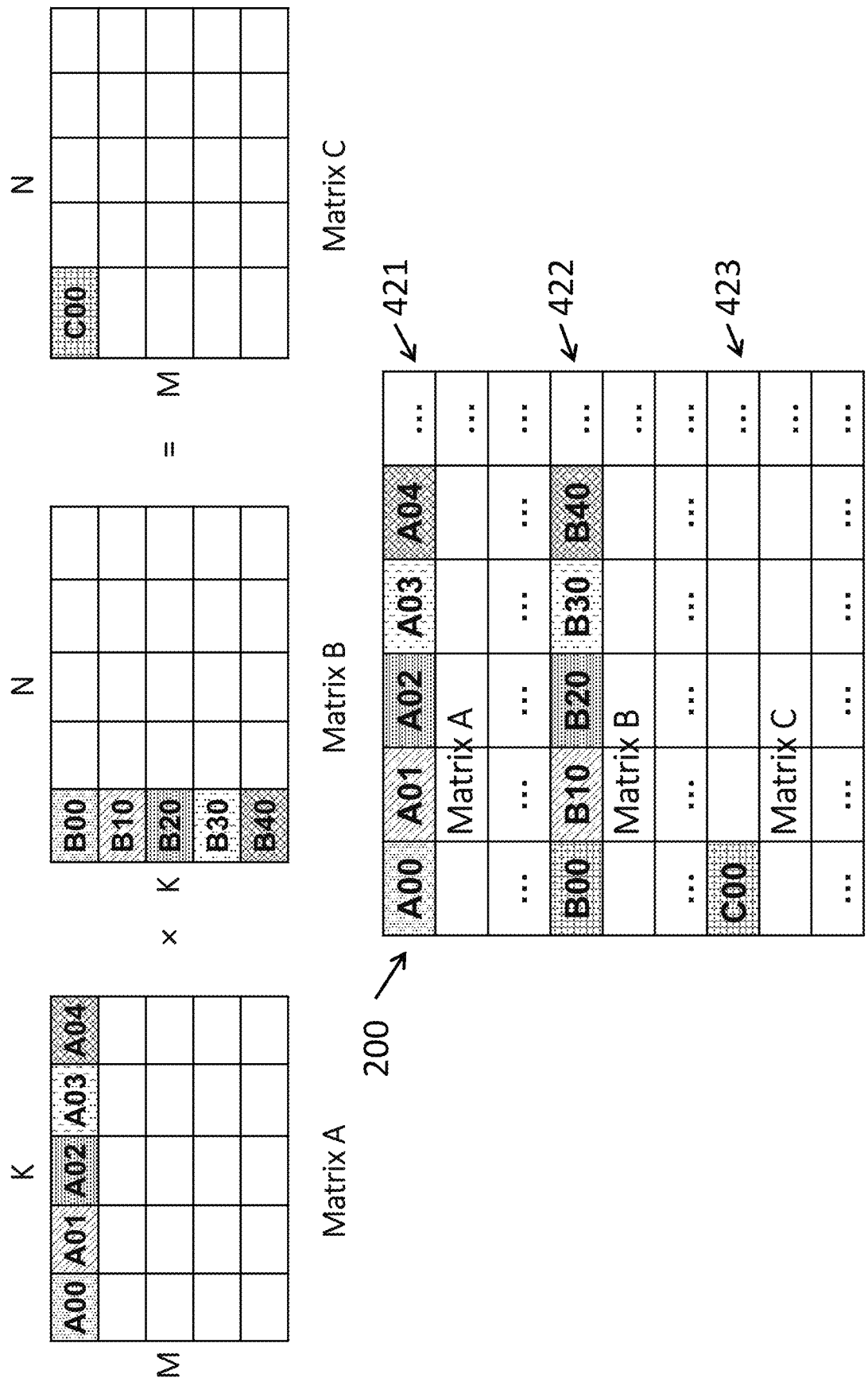
FIG. 7A is a schematic depiction of the multiplication of a first row of matrix A by a first column of matrix B in a different row (DR) data layout, where the operands are stored in different pages of a DRAM bank with in-memory compute according to one embodiment of the present disclosure.

FIG. 7A is a schematic depiction of the multiplication of a first row of matrix A by a first column of matrix B in a different row (DR) data layout, where the operands are stored in different pages of a DRAM bank with in-memory compute according to one embodiment of the present disclosure. As shown in FIG. 7A, the tiles A00, A01, A02, A03, and A04 of the first row of matrix A are stored in page 421 while the tiles B00, B10, B20, B30, and B40 the first column of matrix B are stored in a different page 422.

The process of computing C00 may start with computing A00·B00 by reading A00 from row 421 of the DRAM bank 200, using a PRE, ACT, and READ sequence of commands, followed by reading tile B00 using a PRE, ACT, and READ sequence of commands, because tile B00 is in a different row 422 than tile A00. The ALU 452 may then calculate the A00·B00 and store the result in a temporary buffer. To continue computing C00, tile A01 may be read from row 421 followed by B10 from row 421, where each value involves performing a PRE, ACT, and READ sequence on the DRAM bank 200. Accordingly, each computation takes 2 PRE commands, 2 ACT commands, and 2 READ commands.

Figure 7B:
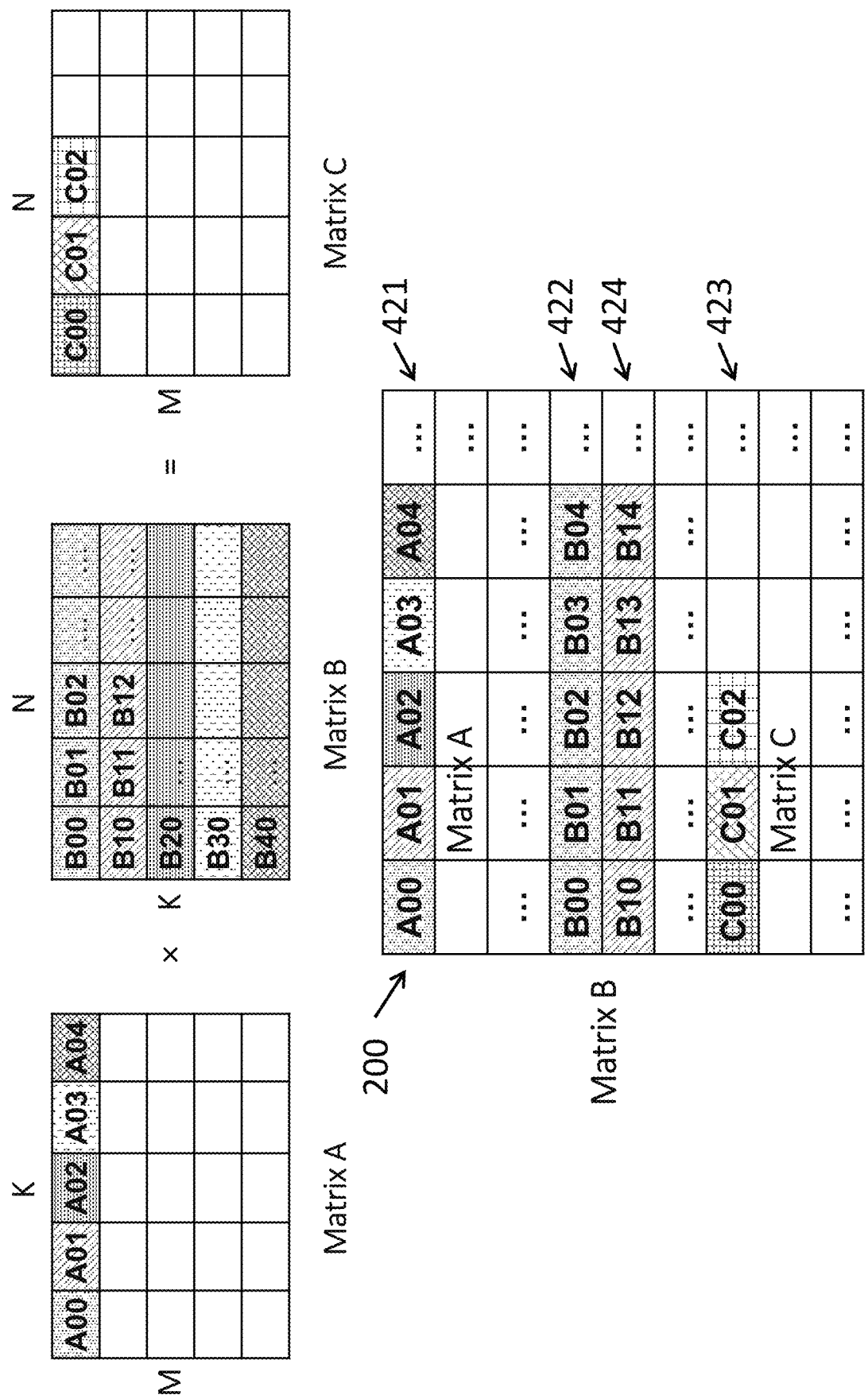
FIG. 7B is a schematic depiction of the multiplication, with data reuse, of a first value of a first row of matrix A by a first value of each column of matrix B and a second value of the first row of matrix A by a second value of each column of matrix B in a DR data layout, where the operands are stored in different pages of a DRAM bank with in-memory compute according to one embodiment of the present disclosure.

FIG. 7B is a schematic depiction of the multiplication, with data reuse, of a first value of a first row of matrix A by a first value of each column of matrix B and a second value of the first row of matrix A by a second value of each column of matrix B in a DR data layout, where the operands are stored in different pages of a DRAM bank with in-memory compute according to one embodiment of the present disclosure.

In a manner similar to that described above with respect to FIG. 5B and data reuse in 1OP, reusing data retrieved from matrix A when performing each of the multiplications with matrix B can result in a reduced number of memory operations. As discussed above with respect to FIG. 7A, each the i-th value of a given row of matrix A is multiplied by each value in the i-th row of matrix B. Accordingly, if all of the values in a given row of matrix B are stored in a same page of the DRAM bank 200, then the number of PRE and ACT commands can be reduced, thereby improving performance.

For example, the process of multiplying matrix A by matrix B may begin with multiplying tile A00 of matrix A by each of the N tiles (B00, B01, B02, . . . , B0N) in the first row of matrix B to compute N partial sums (e.g., parts of C00, C01, C02, . . . , C0N). This process may begin by loading tile A00 from the DRAM bank 200, which may involve a PRE command, an ACT command, and READ command to open row 421 and load tile A00 of matrix A into the operand register Rop 254. After loading A00, the tiles B00, B01, B02, . . . , B0N of the first row of matrix B may be loaded to be multiplied by tile A00. As shown in FIG. 7B, when these values of matrix B are all in the same page (e.g., B00, B01, B02, B03, B04, . . . are in page 422 of the DRAM bank 200 shown in FIG. 7B), then the PRE and ACT commands used to access this page can be amortized across the N values stored in that page. Accordingly, multiplying one value from matrix A by every value in one row of matrix B requires 2 PRE commands, 2 ACT commands, and N+1 READ commands, which, when amortized across the N values of the row, results in 2/N PRE commands, 2/N ACT commands, and (N+1)/N READ commands per computation. In a manner similar to the examples given above, this reduction in the number of DRAM commands improves the performance of the overall computation (e.g., the matrix multiplication operation).

The above-discussed data placement options were experimentally tested using a cycle-level high bandwidth memory-function in memory (HBM-FIM) simulator, which was customized for an in-memory compute (IMC) with general matrix-matrix multiplication (GEMM) traces. The experimental architecture included an HBM with four 4H HBM2 modules, where the DRAM had an array size of 16,384 (16 Kib) rows by 8,192 (8 Kib) columns (e.g., each page is 8,192b in size), and the row buffer had a size of 8,192 bit (8 Kib). The IMC module included a 16-lane FP-16 vector unit with cycles of latency and a 768 bit buffer, and was capable of pipelined operation. In various embodiments, the buffer may be smaller (e.g., 512 bits, including a 256 bit input buffer and a 256 output buffer) or may be larger (e.g., a 1,280 bit buffer with a 256 bit input buffer and 1,024 bit output buffer). In some embodiments, the input buffer is larger than 256 bits (e.g., 512 bits).

Figure 8:
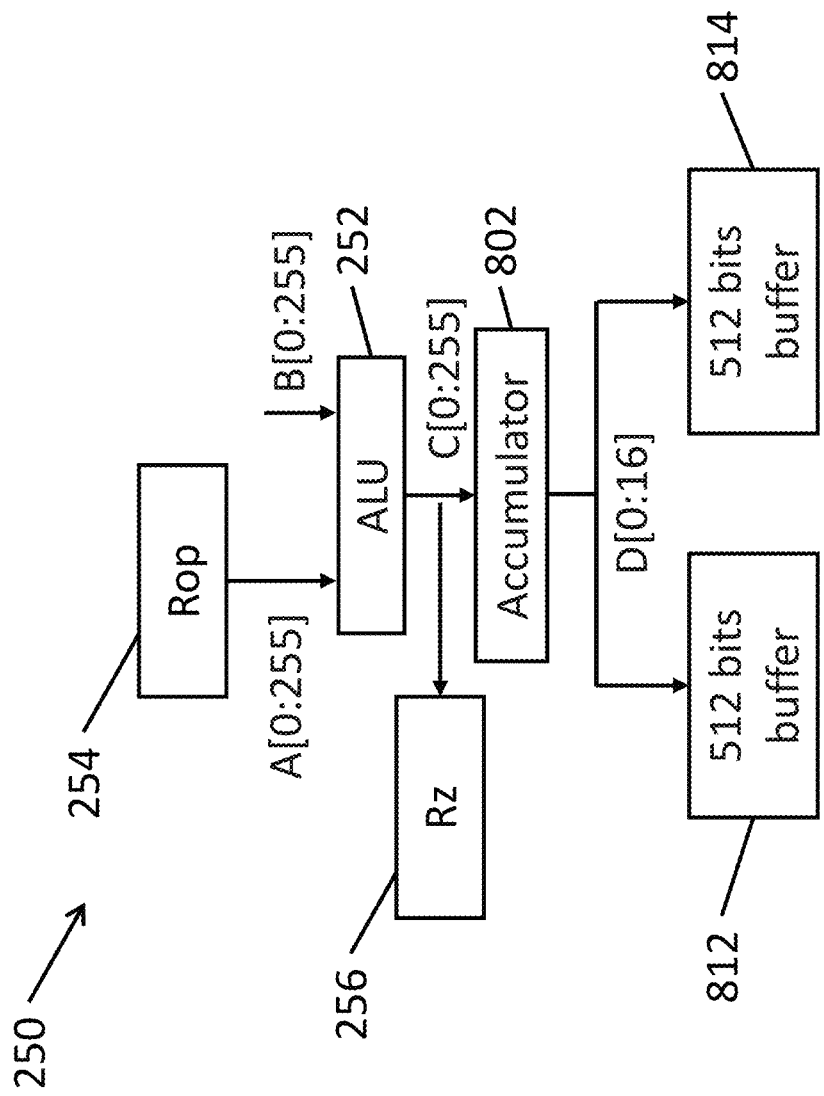
FIG. 8 is a schematic block diagram of an in-memory compute (IMC) module of a DRAM bank, where the IMC module is further connected to a result buffer, an accumulator, and buffers according to one embodiment of the present disclosure.

Some aspects of embodiments of the present disclosure relate to including an additional buffer and an accumulator at the level of the DRAM bank 200 (e.g., additional hardware provided on a per-bank basis at the DRAM bank). FIG. 8 is a schematic block diagram of an in-memory compute (IMC) module of a DRAM bank, where the IMC module is further connected to a result buffer, an accumulator, and buffers according to one embodiment of the present disclosure.

As shown in FIG. 8, the ALU 252 may receive input operand A (labeled in FIG. 8 as a 256 bit operand A[0:255]) and input operand B (labeled in FIG. 8 as a 256 bit operand B[0:255]). The ALU performs an operation on the two input operands (e.g., add, multiply, dot product, outer product, etc.) and computes a result C (labeled in FIG. 8 as a 256 bit result C[0:255]).

As shown in FIG. 8, the IMC module 250 may further include an Accumulator 802 connected to the output of the ALU 252. For example, the output of the ALU 252 may be connected to both the result register Rz 256 and the Accumulator 802 such that the result C is stored in the result register Rz 256 and supplied to the Accumulator 802. The Accumulator 802 include an accumulator register that stores an accumulated value (e.g., a 256 bit value). When the Accumulator 802 received a new result from the ALU 252, the new result is added to (e.g., accumulated with) the accumulated value already stored in the accumulator register (e.g., the value stored in the accumulator register of the Accumulator 802 is updated or set to the sum of the new result and the value that was previously stored in the Accumulator 802). In some embodiments, the Accumulator 802 may be configured to reset the accumulator register (e.g., to set the accumulated value stored in the accumulator register to zero) in response to a reset command. An Accumulator 802 may be particularly helpful when computing inner products or dot products, such as when computing matrix multiplications (e.g., where each value in a result matrix is the inner product of a row of the first operand and a column of the second operand). In the embodiment shown in FIG. 8, the system further includes a 1,024 bit output buffer, shown as a first 512 bit buffer 812 and a second 512 bit buffer 814. A larger output buffer that is capable of storing multiple result values allows the memory controller 140 to control the DRAM banks to compute multiple results at once before opening another page of the DRAM array to store those results. For example, in the case of data reuse in an SR data layout as shown in FIG. 6B, a value from one row of the first operand matrix A is multiplied by different corresponding values from a row of the second operand matrix B to compute partial sums that are written to a different page of the DRAM bank 200 (e.g., page 413 as shown in FIG. 6) than the page storing the operands (e.g., page 411), which may require additional PRE and ACT commands to open the page for storing the results. However, a larger output buffer reduces the amount of page switching that is needed to complete the operation (because each page switch requires a PRE and ACT), thereby improving performance of the computation. While FIG. 8 depicts an IMC module 250 having both an Accumulator 802 and a larger output buffer 812 and 814, embodiments of the present disclosure are not limited thereto and may also include embodiments in which the IMC module 250 includes an accumulator, without additional output buffers 812 and 814, and embodiments in which the IMC module 250 includes additional output buffers 812 and 814, without an accumulator 802. In some embodiments of the present disclosure, the IMC module 250 may include multiple Accumulators 802 arranged in parallel (e.g., such that multiple values may be accumulated concurrently). Embodiments of the present disclosure are further not limited to cases with two 512 bit output buffers 812 and 814, but may include buffers that are larger or smaller than 512 bits and/or more than two output buffers or fewer than two output bufffers. Various portions of the IMC module 250 may have different amounts of latency. For example, when the ALU 252 performing multiplication operations may introduce a four cycle latency, and the accumulation operation may involve a one cycle latency.

Figure 9:
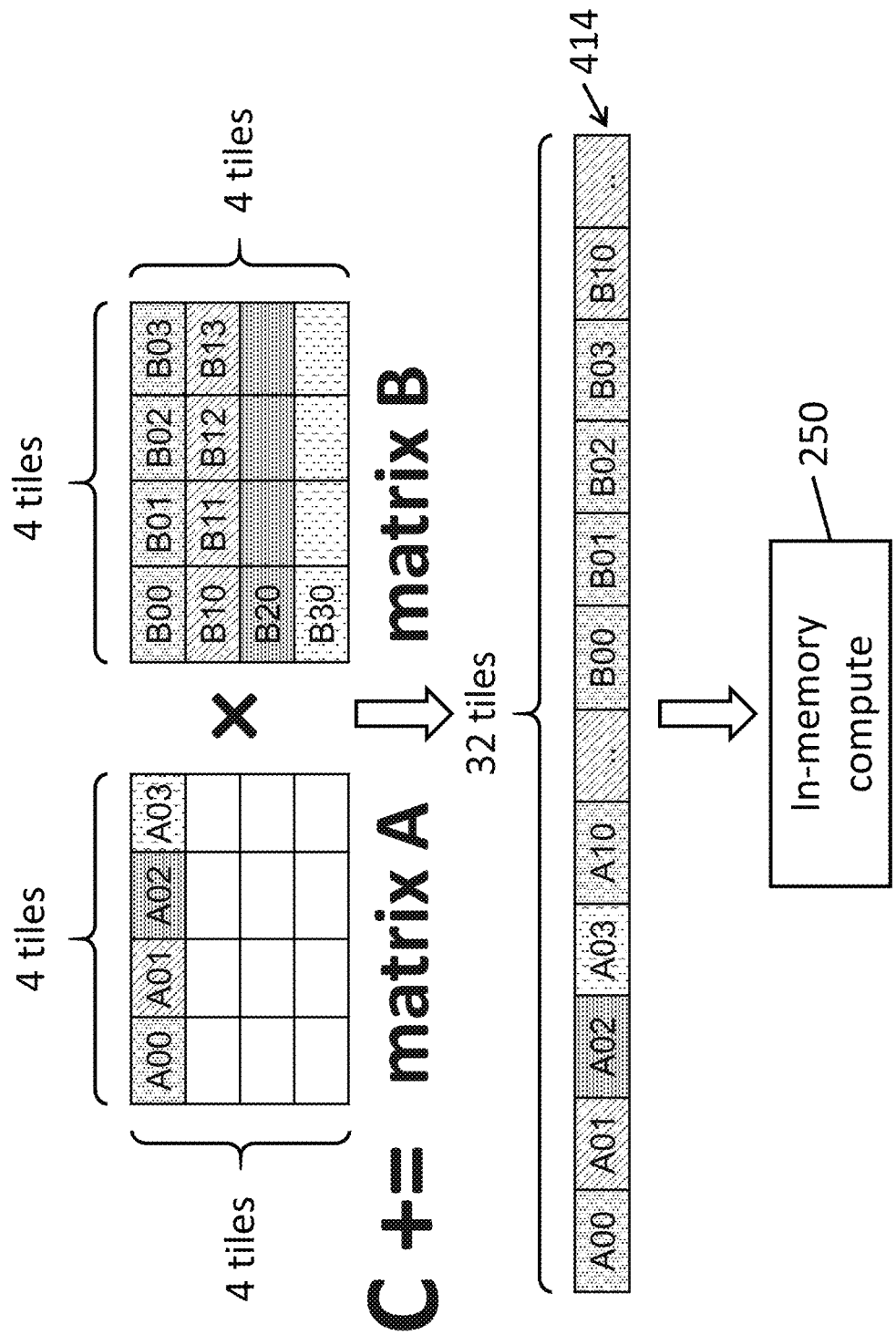
FIG. 9 is a schematic illustration of an example of a general matrix-matrix multiplication (GEMM) to explain computation using a same row (SR) layout according to some embodiments of the present disclosure.

Aspects of embodiments of the present disclosure will be described in more detail below in the context of implementing general matrix-matrix multiplication (GEMM). FIG. 9 is a schematic illustration of an example of a general matrix-matrix multiplication (GEMM) to explain computation using a same row (SR) layout according to some embodiments of the present disclosure. In more detail, FIG. 9 depicts the multiplication of matrix A by matrix B and updating the result C stored in an accumulator (e.g., the accumulator 802) by adding the product of matrix A and matrix B to the value currently stored in the accumulator 802 (result C+=matrix A×matrix B). In the computation shown in FIG. 9, 16 tiles of matrix A and 16 tiles of matrix B are multiplied together, where each tile has 16 FP-16 elements (256 bit). Particular internal tile organization layouts will be discussed in more detail below, but the overall complexity of GEMM remains the same for different layouts. As denoted in FIG. 9, tiles that are shaded with similar patterns are tiles that are multiplied together. As noted above, FIG. 9 depicts a same row (SR) data layout, where all thirty-two values of matrix A and matrix B are stored in a same page 414 of the DRAM bank 200 such that both operands of each computation (e.g., tiles A00 and tiles B00, B01, B02, and B03) are all located in the same page 414. The results of the individual computations may be accumulated in a result register Roz 256 to compute result C.

As one specific example of tile-level multiplication, when computing an inner product (e.g., a dot product) of two tiles A00 and B00 loaded from a same page of the DRAM bank 200, tile A00 may be dotted tile B00 of matrix B. As discussed above, in some embodiments, each tile includes sixteen FP-16 elements. For example, tile A00 may include elements a00, a01, a15, and tile B00 may include elements b00, b01, b15, and the inner product of tiles A00 and B00 is the sum of the pairs of products: a00*b00+a01*b01++ a15*b15. Accordingly, an inner product (or dot product) of two tiles produces a single element or single value, and therefore an in-memory compute (IMC) module according to embodiments of the present disclosure can compute an inner product with fewer buffer registers for storing the results (e.g., an accumulator register 802). Accordingly, an IMC module according to some embodiments of the present disclosure that includes an accumulator register may be well suited to performing computations that involve the accumulation of values, such as computing an inner product. In some embodiments, an IMC module with an accumulator that is suited for computing an inner product is used for performing inference (or forward propagation) using a trained neural network, such as where one operand may represent inputs (e.g., activations from a previous layer) and a second operand may represent the weights associated with neurons of a layer of the trained neural network.

As another example of tile-level multiplication, when computing an outer product of two tiles loaded from a same page of the DRAM bank 200, every value of the first tile is multiplied by every value of the second tile, and both tiles can be loaded at the same time if. For example, in the case where each tile includes sixteen values, as described above, the outer product of two tiles has 16*16=256 output values. An outer product can be computed with simpler hardware than an inner product because no tree-adder accumulations are needed and because the 256 output values can be computed in parallel. However, computing an outer product needs many output buffer registers (e.g., output buffers 812 and 814) in an in-memory compute module 250 according to embodiments of the present disclosure (e.g., in order to store all of the values of the result of the outer product). For example, assuming that each tile includes a maximum of sixteen FP-16 values, an IMC module 250 configured to compute outer products may include an output buffer sufficiently large to store 256 values (e.g., 256*16 bit=4,096 bit buffer). Accordingly, an IMC module according to some embodiments of the present disclosure that includes an output buffer has a size for storing greater than or equal to the product of the number of values in the tiles of the first and second operands (in the above example, the output buffer stores at least 256 values because each of the tiles of the operands includes 16 values) may be well suited to performing computations that involve an outer product of the operands.

As a third example of tile-level multiplication, when computing a tensor product of two tiles loaded from a same page of the DRAM bank 200, the two tiles may include values that are arranged in a matrix. For example, in the case where each tile includes sixteen FP-16 values, as described above, each tile may be arranged into a 4 by 4 matrix of values. Computing the tensor product of these tiles generates a 4 by 4 result matrix of values. For example, assuming that each tile includes a maximum of sixteen FP-16 values, an IMC module 250 configured to compute tensor products of two 4 by 4 tiles of 16 values may have an output buffer large enough to store 16 values (e.g., 16*16 bit=256 bit buffer). Accordingly, an IMC module according to embodiments of the present disclosure that includes an output buffer sufficiently large to store a number of values equal to the number of values in the larger of the first and second operand may be well suited to performing computations that involve a tensor product of the operands. Implementing a tensor product in an in-memory compute module according to embodiments of the present disclosure presents a middle ground with simpler hardware and an intermediate number of buffer registers compared to IMC module hardware that is suited to computing inner products and computing outer products.

In more detail, performing a tensor product between two 4 by 4 matrixes A and B involves 64 multiplication operations, 48 addition operations, and a transpose on matrix A/matrix B. When using a 16 lane e-ALU 252 according to one embodiment of the present disclosure, 16 operations can be performed in parallel. As such, the 64+48=112 operations can be performed in seven cycles of the ALU (assuming that the multiplications can be performed in one cycle). In another embodiment of the present disclosure, in order to increase performance, a 64 lane ALU 252 may be used to compute the tensor product of the two tiles representing two 4 by 4 matrixes in 2 to 3 cycles or 4-6 nanoseconds. Accordingly, increasing the number of lanes in the ALU 252 may increase the amount of parallelization possible between the computations, thereby also increasing performance.

Accordingly, aspects of embodiments of the present disclosure relate to systems and methods for data placement in a dynamic random access memory (DRAM) system with in-memory compute. In the above three examples of computing an inner product, an outer product, and a tensor product in the context of a SR (single page) data layout, a single row included a first tile with row data (of a matrix) in the same page as a second tile with column data (of a matrix).

According to some embodiments of the present disclosure, the memory controller 140 (or client-side memory controller) of the memory module 110 controls the placement of data (operands) received from the host processor 170 in accordance with an instruction received from the host processor 170. For example, based on whether the instruction is to compute a dot product, an outer product, or tensor product, and based on the sizes of the operands (e.g., dimensions of the matrixes), the memory controller 140 may use the 1OP, SR, or DR data layouts and control the DRAM banks to store data accordingly.

Figure 10:
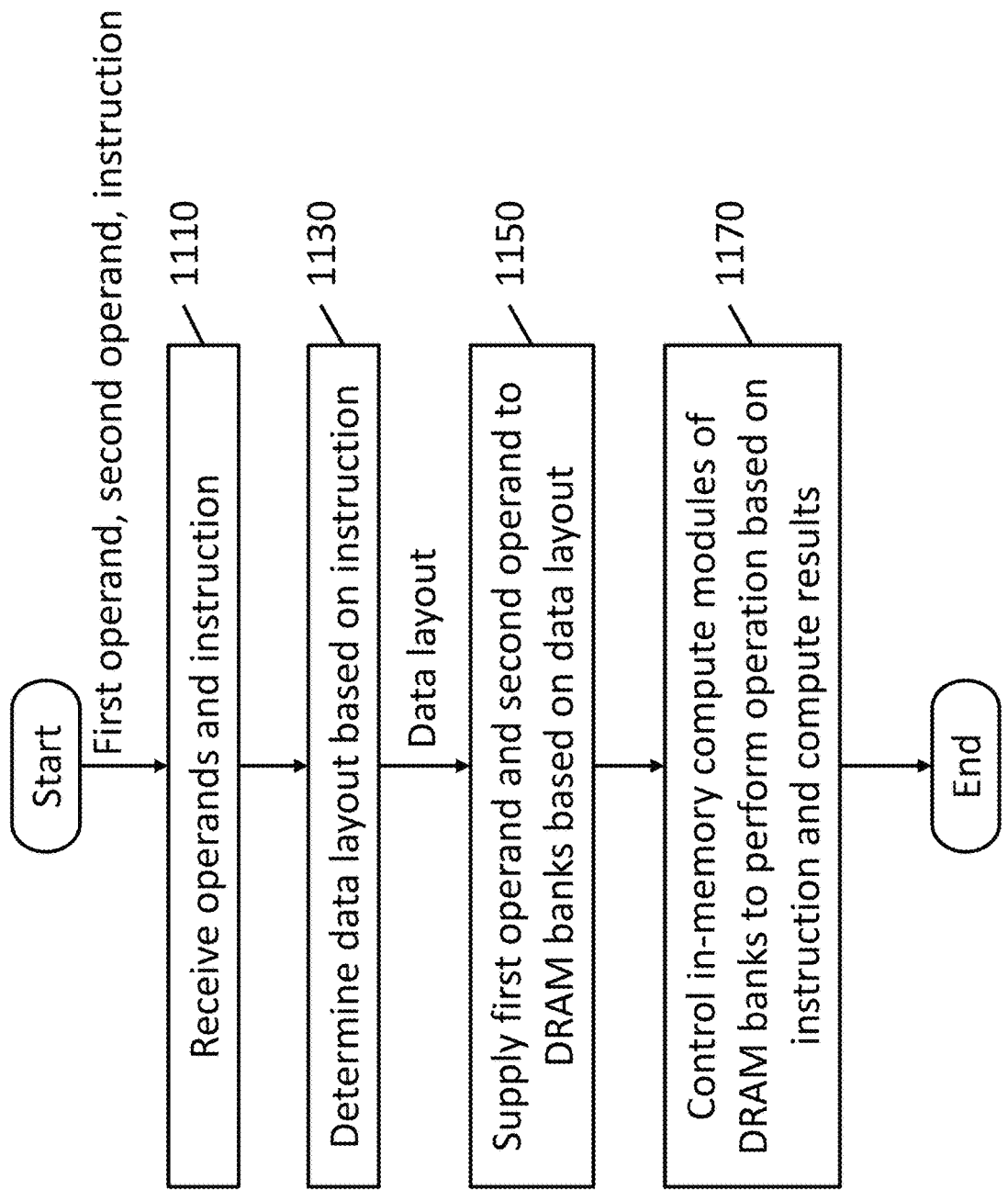
FIG. 10 is a flowchart of a method for controlling placement of data in DRAM banks with in-memory compute modules in accordance with embodiments of the present disclosure.

FIG. 10 is a flowchart of a method for controlling placement of data in DRAM banks with in-memory compute modules in accordance with embodiments of the present disclosure. In operation 1110, the memory controller 140 receives the operands (e.g., a first operand and a second operand) and an instruction (e.g., a function) to be applied to the operands. These instructions may include, for example, computing an inner product, an outer product, performing an inference using a trained neural network and an input vector, performing a step of the backpropagation algorithm for training a neural network, and the like.

In operation 1130, the memory controller 140 determines which data layout (e.g., 1OP, SR, or DR) to use for storing the one or both operands in the DRAM banks on the DRAM die based on the instruction. In some embodiments, the instruction (e.g., from the host memory controller 180) explicitly specifies which data layout to use. In some embodiments, a layout is selected based on the types of computations that will be performed, and the memory or hardware requirements for accelerating such computations in the DRAM banks (e.g., instructions to compute dot products may cause data to be placed in DRAM banks having accumulators, whereas instructions to compute outer products may cause data to be placed in DRAM banks having more output buffers). In operation 1150, the memory controller 140 supplies the first operand and the second operand to the DRAM banks based on the selected layout. For example, in the 1OP case, the memory controller 140 controls the DRAM banks 200 to store at least a first tile of the first operand and supplies the tiles of the second operand directly to the IMC modules of the DRAM banks. As another example, in the SR case, the memory controller 140 controls the DRAM banks 200 to store tiles corresponding to the first and second operands in the same row or same page of the DRAM banks.

In operation 1170, the memory controller controls the in-memory compute modules of the DRAM banks to perform an operation based on the input instruction. For example, in the case of an instruction to perform an inference using a trained model, the operations may include preparing an input vector based on one operand and weighting the values of the input vector based on the stored parameters in the second operand.

While the present disclosure has presented certain exemplary embodiments, it is to be understood that the present disclosure is not limited to the disclosed embodiments, but, on the contrary, is intended to cover various modifications and equivalent arrangements included within the spirit and scope of the appended claims, and equivalents thereof.

What is claimed is:

1. A memory module comprising:
   a memory die comprising a dynamic random access memory (DRAM) bank comprising:
      an array of DRAM cells arranged in a plurality of pages; and
      an in-memory compute (IMC) module comprising:
         an arithmetic logic unit (ALU); and
   a memory controller configured to:
      receive, from a host processor, an operand and an instruction;
      determine, based on the instruction, a data layout from a plurality of data layouts, the data layout specifying placement of the operand among the pages of the array of DRAM cells and the IMC;
      supply the operand to the DRAM bank in accordance with the data layout; and
      control the IMC module of the DRAM bank to perform an ALU operation on the operand in accordance with the instruction.

2. The memory module of claim 1, wherein the data layouts comprise:
   a one operand (1OP) data layout, wherein a first operand is read from the DRAM cells and the operand comprises a second operand, the second operand being supplied directly from the host processor to the IMC of the DRAM bank.

3. The memory module of claim 2, wherein the first operand is divided into a plurality of first tiles and the second operand is divided into a plurality of second tiles, each tile comprising a plurality of values,
   wherein the IMC module further comprises an operand register, and
   wherein the memory controller is further configured to:
      store a first tile of the first operand in the operand register; and
      perform the ALU operation on the first operand stored in the operand register and each of a plurality of second tiles of the second operand.

4. The memory module of claim 1, wherein the operand is divided into a plurality of first tiles and a second operand is divided into a plurality of second tiles, each tile comprising a plurality of values, and
   wherein the data layouts comprise a same page (SR) data layout, wherein the memory controller stores one or more of the first tiles and one or more of the second tiles in a same page of the DRAM cells.

5. The memory module of claim 4, wherein the IMC module further comprises an operand register, and
   wherein the memory controller is further configured to:
      store a first tile of the one or more of the first tiles in the operand register; and
      perform the ALU operation on the first tile stored in the operand register and each of the one or more second tiles stored in the same page of the array of DRAM cells as the first tile.

6. The memory module of claim 5, wherein the IMC module of the DRAM bank further comprises an accumulator, the accumulator comprising an accumulator register configured to store an accumulated value, the accumulator being configured to:
receive the output computed by the ALU; and
update the accumulator register with the sum of the accumulated value and the output, and
wherein the instruction comprises computing an inner product of the operand and the second operand, wherein the first tile of the first tiles stores row data and a second tile of the second tiles comprises column data.

7. The memory module of claim 5, wherein the first tile has a first number of values and the second tile has a second number of values,
wherein the IMC module of the DRAM bank comprises an output buffer, the output buffer having a size for storing greater than or equal to the product of the first number of values and the second number of values, and
wherein the instruction comprises computing an outer product of the operand and the second operand, wherein the first tile of the first tiles stores row data and a second tile of the second tiles comprises column data.

8. The memory module of claim 5, wherein the first tile has a first number of values and the second tile has a second number of values,
wherein the IMC module of the DRAM bank comprises an output buffer, the output buffer having a size for storing greater than or equal to the larger of the first number of values and the second number of values, and
wherein the instruction comprises computing a tensor product of the operand and the second operand, wherein the first tile of the first tiles stores row data and a second tile of the second tiles comprises column data.

9. The memory module of claim 1, wherein the operand is divided into a plurality of first tiles and a second operand is divided into a plurality of second tiles, each tile comprising a plurality of values, and
wherein the data layouts comprise a different page (DR) data layout wherein the memory controller stores a subset of the first tiles in a first page of the array of DRAM cells and a subset of the second tiles in a second page of the array of DRAM cells.

10. The memory module of claim 9, wherein the IMC module further comprises an operand register, and
wherein the memory controller is further configured to:
store a first tile of the operand from the first page in the operand register; and
perform the ALU operation on the first tile of the operand stored in the operand register and each of a plurality of second tiles of the second operand from the second page.

11. The memory module of claim 1, the IMC module of the DRAM bank further comprising a hardware buffer configured to buffer the output computed by the ALU.

12. The memory module of claim 11, wherein the hardware buffer is at least four times the size of a result register of the IMC module.

13. The memory module of claim 1, the IMC module of the DRAM bank further comprising an accumulator, the accumulator comprising an accumulator register configured to store an accumulated value, the accumulator being configured to:
receive the output computed by the ALU; and
update the accumulator register with the sum of the accumulated value and the output.

14. The memory module of claim 1, wherein the memory module is a high bandwidth memory (HBM) module comprising a stack of memory dies connected by through silicon vias, the stack of memory dies comprising the memory die.

15. A method for performing computations in-memory comprising:
receiving, by a memory controller of a memory module, an operand and an instruction;
determining, by the memory controller, based on the instruction, a data layout from a plurality of data layouts;
supplying the operand to a dynamic random access memory (DRAM) bank of the memory module in accordance with the data layout, the DRAM bank comprising:
an array of DRAM cells arranged in a plurality of pages; and
an in-memory compute (IMC) module comprising an arithmetic logic unit (ALU); and
controlling the IMC module of the DRAM bank to perform an ALU operation on the operand in accordance with the instruction,
wherein the data layout specifies placement of the operand among the pages of the array of DRAM cells and the IMC.

16. The method of claim 15, wherein the data layouts comprise:
a one operand (1OP) data layout, wherein a first operand is written to the DRAM cells and the operand comprises a second operand, the second operand being supplied directly from a host processor to the IMC module of the DRAM bank.

17. The method of claim 16, wherein the first operand is divided into a plurality of first tiles and the second operand is divided into a plurality of second tiles, each tile comprising a plurality of values,
wherein the IMC module further comprises an operand register, and
wherein the memory controller is further configured to:
store a first tile of the first operand in the operand register; and
perform the ALU operation on the first operand stored in the operand register and each of a plurality of second tiles of the second operand.

18. The method of claim 15, wherein the operand is divided into a plurality of first tiles and a second operand is divided into a plurality of second tiles, each tile comprising a plurality of values, and
wherein the data layouts comprise a same page (SR) data layout, wherein the memory controller stores one or more of the first tiles and one or more of the second tiles in a same page of the DRAM cells.

19. The method of claim 18, wherein the IMC module further comprises an operand register, and
wherein the memory controller is further configured to:
store a first tile of the one or more of the first tiles in the operand register; and
perform the ALU operation on the first tile stored in the operand register and each of the one or more second tiles stored in the same page of the array of DRAM cells as the first tile.

20. The method of claim 19, wherein the IMC module of the DRAM bank further comprises an accumulator, the accumulator comprising an accumulator register configured to store an accumulated value, the accumulator being configured to:
receive the output computed by the ALU; and
update the accumulator register with the sum of the accumulated value and the output, and wherein the instruction comprises computing an inner product of the operand and the second operand, wherein the first tile of the first tiles stores row data and a second tile of the second tiles comprises column data.

21. The method of claim 19, wherein the first tile has a first number of values and the second tile has a second number of values,
wherein the IMC module of the DRAM bank comprises an output buffer, the output buffer having a size for storing greater than or equal to the product of the first number of values and the second number of values, and
wherein the instruction comprises computing an outer product of the operand and the second operand, wherein the first tile of the first tiles stores row data and a second tile of the second tiles comprises column data.

22. The method of claim 19, wherein the first tile has a first number of values and the second tile has a second number of values,
wherein the IMC module of the DRAM bank comprises an output buffer, the output buffer having a size for storing greater than or equal to the larger of the first number of values and the second number of values, and
wherein the instruction comprises computing a tensor product of the operand and the second operand, wherein the first tile of the first tiles stores row data and a second tile of the second tiles comprises column data.

23. The method of claim 15, wherein the operand is divided into a plurality of first tiles and a second operand is divided into a plurality of second tiles, each tile comprising a plurality of values, and
wherein the data layouts comprise a different page (DR) data layout wherein the memory controller stores a subset of the first tiles in a first page of the array of DRAM cells and a subset of the second tiles in a second page of the array of DRAM cells.

24. The method of claim 23, wherein the IMC module further comprises an operand register, and
wherein the memory controller is further configured to:
store a first tile of the operand from the first page in the operand register; and
perform the ALU operation on the first tile stored in the operand register and each of a plurality of second tiles of the second operand from the second page.

* * * * *